United States Patent
Kang et al.

(10) Patent No.: US 10,557,084 B2
(45) Date of Patent: Feb. 11, 2020

(54) ALIGNMENT FILM COMPOSITION, LIQUID CRYSTAL DISPLAY DEVICE, AND METHOD OF MANUFACTURING LIQUID CRYSTAL DISPLAY DEVICE

(71) Applicant: Samsung Display Co., Ltd., Yongin-si (KR)

(72) Inventors: Suk Hoon Kang, Seoul (KR); Jong Hwan Jeon, Hwaseong-si (KR); Jin Soo Jung, Hwaseong-si (KR); In Ok Kim, Osan-si (KR); Baek Kyun Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 22 days.

(21) Appl. No.: 15/400,496

(22) Filed: Jan. 6, 2017

(65) Prior Publication Data

US 2017/0283702 A1 Oct. 5, 2017

(30) Foreign Application Priority Data

Apr. 5, 2016 (KR) .................. 10-2016-0041537

(51) Int. Cl.
*C09K 19/56* (2006.01)
*B05D 1/00* (2006.01)
(Continued)

(52) U.S. Cl.
CPC .............. *C09K 19/56* (2013.01); *B05D 1/005* (2013.01); *B05D 1/265* (2013.01); *B05D 3/0254* (2013.01);
(Continued)

(58) Field of Classification Search
CPC .......... G02F 1/133723; G02F 1/13378; G02F 1/133788; G02F 1/133711; C09D 179/08;
(Continued)

(56) References Cited

U.S. PATENT DOCUMENTS 6,063,829 A 5/2000 Endou et al.
2012/0229744 A1* 9/2012 Hattori ................. C08F 2/50
349/124
(Continued)

FOREIGN PATENT DOCUMENTS

JP 2008-116809 5/2008
JP 2012-093642 5/2012
(Continued)

OTHER PUBLICATIONS

Tillet et al. "Progress in polymer science 2011—Chemical reactions of polymer crosslinking and post-crosslinking at room and medium temperature", Progress in Polymer Science, Sep. 21, 2010, pp. 191-217, vol. 36, Elsevier Ltd.

*Primary Examiner* — Ruiyun Zhang
(74) *Attorney, Agent, or Firm* — H.C. Park & Associates, PLC

(57) ABSTRACT

An alignment film composition includes a copolymer of a dianhydride-based compound and a diamine-based compound, and a cross-linker. The copolymer has a structure represented by Chemical Formula Ia or Chemical Formula Ib, and the cross-linker is represented by Chemical Formula IIa or Chemical Formula IIb:

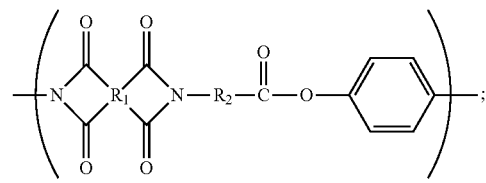

<Chemical Formula Ia>

(Continued)

-continued

<Chemical Formula Ib>

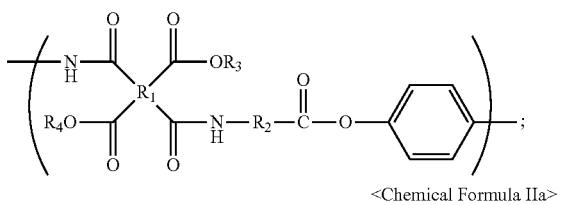

<Chemical Formula IIa>

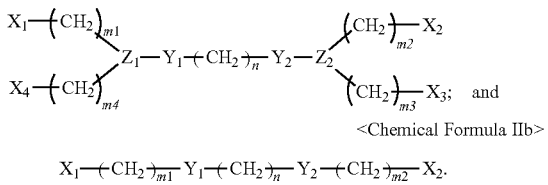 and

<Chemical Formula IIb>

$X_1\!-\!(CH_2)_{\overline{m1}}\!-\!Y_1\!-\!(CH_2)_{\overline{n}}\!-\!Y_2\!-\!(CH_2)_{\overline{m2}}\!-\!X_2$.

20 Claims, 9 Drawing Sheets

(51) Int. Cl.
| | | |
|---|---|---|
| *B05D 1/26* | (2006.01) | |
| *B05D 3/02* | (2006.01) | |
| *B05D 3/06* | (2006.01) | |
| *C09D 179/08* | (2006.01) | |
| *G02F 1/1337* | (2006.01) | |

(52) U.S. Cl.
CPC ............ *B05D 3/065* (2013.01); *C09D 179/08* (2013.01); *G02F 1/13378* (2013.01); *G02F 1/133723* (2013.01); *G02F 1/133788* (2013.01); *Y10T 428/10* (2015.01); *Y10T 428/1005* (2015.01); *Y10T 428/1023* (2015.01)

(58) Field of Classification Search
CPC ................ C08G 73/10; C08G 73/1007; C08G 73/1046; C08G 73/1064; C09K 19/56; Y10T 428/10; Y10T 428/1005; Y10T 428/1018; Y10T 428/1023
USPC ......... 428/1.1, 1.2, 1.25, 1.26; 349/123, 130, 349/132; 524/600, 602; 525/436; 528/310, 350, 353
See application file for complete search history.

(56) References Cited

U.S. PATENT DOCUMENTS

| | | | |
|---|---|---|---|
| 2015/0241739 A1* | 8/2015 | Park | G02F 1/133788 349/42 |
| 2016/0070142 A1* | 3/2016 | Kang | C08G 73/10 349/43 |
| 2016/0109759 A1 | 4/2016 | Kang et al. | |
| 2016/0195777 A1 | 7/2016 | Lee et al. | |

FOREIGN PATENT DOCUMENTS

| | | |
|---|---|---|
| JP | 2014-029465 | 2/2014 |
| JP | 2014-130366 | 10/2014 |
| KR | 10-2016-0047030 | 5/2016 |
| KR | 10-2016-0085407 | 7/2016 |

\* cited by examiner

ALIGNMENT FILM COMPOSITION, LIQUID CRYSTAL DISPLAY DEVICE, AND METHOD OF MANUFACTURING LIQUID CRYSTAL DISPLAY DEVICE

CROSS-REFERENCE TO RELATED APPLICATION

This application claims priority from and the benefit of Korean Patent Application No. 10-2016-0041537, filed on Apr. 5, 2016, which is hereby incorporated by reference for all purposes as if fully set forth herein.

BACKGROUND

Field

Exemplary embodiments relate to an alignment film composition, a liquid crystal display device, and a method of manufacturing a liquid crystal display device. More particularly, exemplary embodiments relate to an alignment film composition, a method of manufacturing a liquid crystal display device using the alignment film composition, and a liquid crystal display device manufactured by the method.

Discussion of the Background

A liquid crystal display device, which may be one of the most widely used flat panel display devices, includes two substrates provided with field generating electrodes, such as a pixel electrode and a common electrode, and a liquid crystal layer disposed between the two substrates.

In general, a voltage may be applied to the field generating electrodes of a liquid crystal display, to generate an electric field in the liquid crystal layer, such that the direction of liquid crystal molecules in the liquid crystal layer may be determined and the polarization of incident light is controlled, thereby displaying an image.

In order for the liquid crystal display device to display an image, liquid crystal molecules in the liquid crystal layer should be aligned in a predetermined direction at the interface between the liquid crystal molecules and the field generating electrodes. The degree of uniformity of alignment of the liquid crystal molecules is an important factor in determining the image quality of the liquid crystal display device. To this end, an alignment film having anisotropy may be formed between the liquid crystal layer and the field generating electrode, thereby arranging the liquid crystal molecules in one direction.

As a method of forming an alignment film having anisotropy, light may be irradiated to a polymer alignment film to provide anisotropy to the polymer alignment. The materials that may be used in a photo-alignment method may include polymers having a photo-functional group, such as cyclobutane, azobenzene, cumarine, imide, chalcone, and cinnamate. Such polymers may induce anisotropy through photoisomerization, photopolymerization, or photodecomposition using the irradiation of polarized light.

However, such a photo-alignment film using a polymer having a photo-functional group has a limitation in improving the display quality of the liquid crystal display device. Specifically, a liquid crystal display device using a conventional photo-alignment film may not have sufficient film hardness, which may cause low durability and weak alignment force in the liquid crystal display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide an alignment film composition including a photo-aligning polymer material.

Exemplary embodiments also provide an alignment film composition that may improve the film hardness of a photo-alignment film and reduce occurrence of afterimages when driving a liquid crystal display device.

Exemplary embodiments further provide an alignment film composition that may improve alignment force and alignment uniformity by suppressing the aggregation of a cross-linker.

Exemplary embodiments further provide a liquid crystal display device having improved display quality and a method of manufacturing the liquid crystal display device.

Additional aspects will be set forth in the detailed description which follows, and, in part, will be apparent from the disclosure, or may be learned by practice of the inventive concept.

According to an exemplary embodiment of the present invention, an alignment film composition includes a copolymer, a dianhydride-based compound, and a diamine-based compound, the copolymer having a structure represented by Chemical Formula Ia or Chemical Formula Ib in a repetitive unit, and a cross-linker represented by Chemical Formula IIa or Chemical Formula IIb.

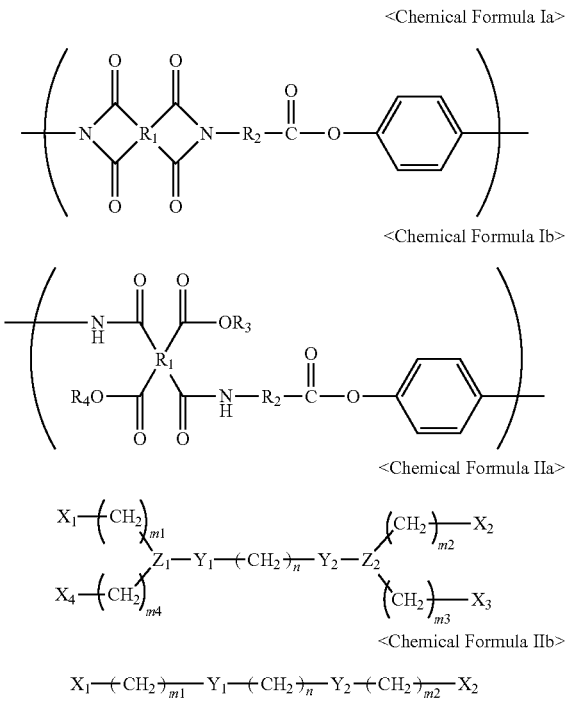

In Chemical Formula Ia and Chemical Formula Ib, $R_1$ is a tetravalent organic group derived from an alicyclic dianhydride or an aromatic dianhydride, and $R_2$ is a divalent organic group derived from an alicyclic diamine or an aromatic diamine. In Chemical Formula Ib, R3 and R4 are each independently hydrogen, a substituted or unsubstituted alkyl group, or a substituted or unsubstituted aryl group. In Chemical Formula IIa and Chemical Formula IIb, $X_1$ to $X_4$ are each independently any one of a hydroxyl group (—OH), an amino group (—NH$_2$), an epoxy group, an aziridine group, a carbodiimide group, an acrylate group, a methacrylate group, and a vinyl group, $Y_1$ and $Y_2$ are each independently any one of a single bond, —CO—, —COO—, —OCO—, —S—, —O—, —OOC— —CH$_2$CH$_2$O—, —OCH$_2$CH$_2$—, an aromatic compound of 6 to 30 carbon atoms, and an alicyclic compound of 4 to 20 carbon atoms, m1 to m4 are each independently an integer of 0 to 6, and n is an integer of 2 to 18. In Chemical Formula IIa, $Z_1$ and $Z_2$ are each independently any one of

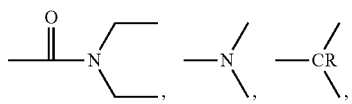

R being H or an alkyl group of 1 to 3 carbon atoms, an aromatic compound of 6 to 30 carbon atoms, and an alicylic compound of 4 to 20 carbon atoms.

According to an exemplary embodiment of the present invention, a method of manufacturing a liquid crystal display device includes providing a substrate, applying an alignment film composition onto the substrate, heat-treating the alignment film composition to form an alignment film; irradiating the heat-treated alignment film with linearly polarized light, and heat-treating the light-irradiated alignment film. The alignment film composition includes a copolymer having a structure represented by Chemical Formula Ia or Chemical Formula Ib in a repetitive unit, and a cross-linker represented by Chemical Formula IIa or Chemical Formula IIb.

hydride or an aromatic dianhydride, and $R_2$ is a divalent organic group derived from an alicyclic diamine or an aromatic diamine. In Chemical Formula Ib, R3 and R4 are each independently hydrogen, a substituted or unsubstituted alkyl group, or a substituted or unsubstituted aryl group. In Chemical Formula IIa and Chemical Formula IIb, $X_1$ to $X_4$ are each independently any one of a hydroxyl group (—OH), an amino group (—NH$_2$), an epoxy group, an aziridine group, a carbodiimide group, an acrylate group, a methacrylate group, and a vinyl group, $Y_1$ and $Y_2$ are each independently any one of a single bond, —CO—, —COO—, —OCO—, —S—, —O—, —OOC— —CH$_2$CH$_2$O—, —OCH$_2$CH$_2$—, an aromatic compound of 6 to 30 carbon atoms, and an alicyclic compound of 4 to 20 carbon atoms, m1 to m4 are each independently an integer of 0 to 6, and n is an integer of 2 to 18. In Chemical Formula IIa, $Z_1$ and $Z_2$ are each independently any one of

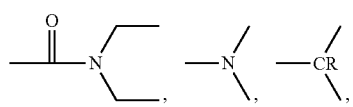

R being H or an alkyl group of 1 to 3 carbon atoms, an aromatic compound of 6 to 30 carbon atoms, and an alicylic compound of 4 to 20 carbon atoms.

According to an exemplary embodiment of the present invention, a liquid crystal display device includes a substrate and an alignment film disposed on the substrate. The alignment film includes a copolymer having a structure represented by Chemical Formula Ia or Chemical Formula Ib in a repetitive unit, and a cross-linking combination including the copolymer cross-linked with a cross-linker represented by Chemical Formula IIa or Chemical Formula IIb.

<Chemical Formula Ia>

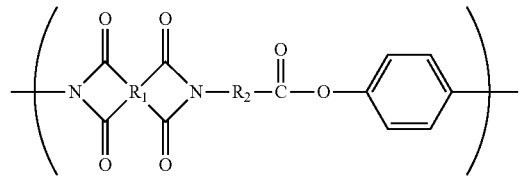

<Chemical Formula Ib>

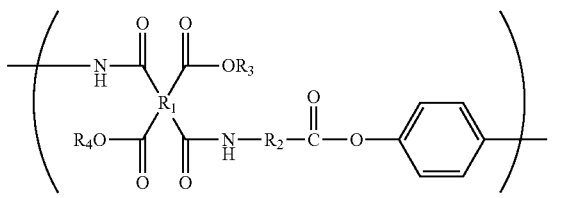

<Chemical Formula IIa>

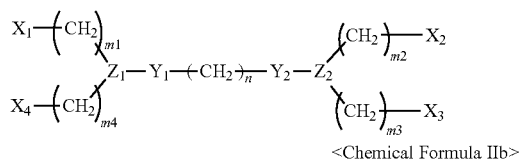

<Chemical Formula IIb>

<Chemical Formula Ia>

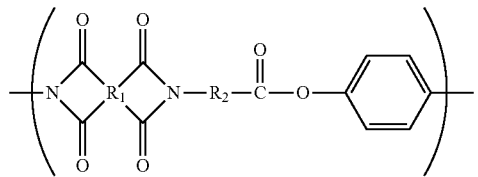

<Chemical Formula Ib>

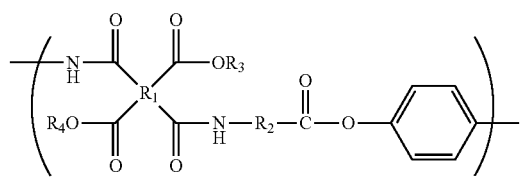

<Chemical Formula IIa>

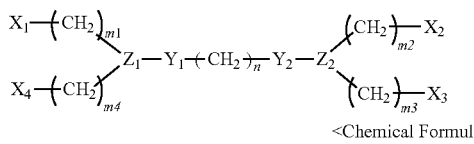

<Chemical Formula IIb>

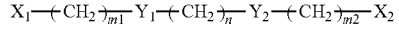

In Chemical Formula Ia and Chemical Formula Ib, $R_1$ is a tetravalent organic group derived from an alicyclic dianhydride or an aromatic dianhydride, and $R_2$ is a divalent organic group derived from an alicyclic diamine or an aromatic diamine. In Chemical Formula Ib, R3 and R4 are each independently hydrogen, a substituted or unsubstituted alkyl group, or a substituted or unsubstituted aryl group. In Chemical Formula IIa and Chemical Formula IIb, $X_1$ to $X_4$ are each independently any one of a hydroxyl group (—OH), an amino group (—$NH_2$), an epoxy group, an aziridine group, a carbodiimide group, an acrylate group, a methacrylate group, and a vinyl group, $Y_1$ and $Y_2$ are each independently any one of a single bond, —CO—, —COO—, —OCO—, —S—, —O—, —OOC— —$CH_2CH_2O$—, —$OCH_2CH_2$—, an aromatic compound of 6 to 30 carbon atoms, and an alicyclic compound of 4 to 20 carbon atoms, m1 to m4 are each independently an integer of 0 to 6, and n is an integer of 2 to 18. In Chemical Formula IIa, $Z_1$ and $Z_2$ are each independently any one of

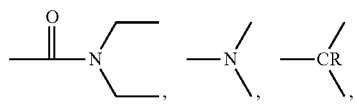

R being H or an alkyl group of 1 to 3 carbon atoms), an aromatic compound of 6 to 30 carbon atoms, and an alicyclic compound of 4 to 20 carbon atoms.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
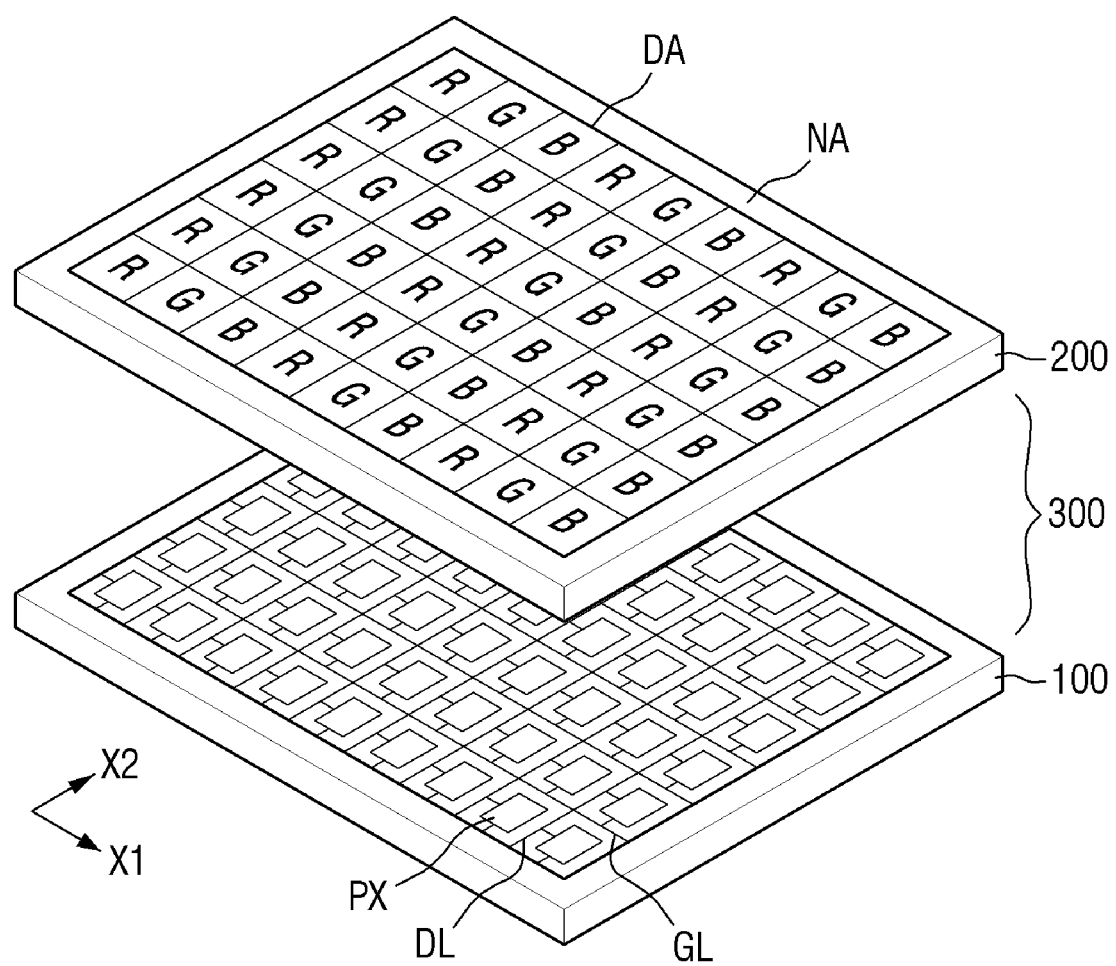
FIG. 1 is a schematic exploded perspective view of a liquid crystal display device according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a schematic exploded perspective view of a liquid crystal display device according to an exemplary embodiment of the present invention.

Referring to FIG. 1, the liquid crystal display device according to the present exemplary embodiment includes a first substrate 100, a first alignment film (not shown) disposed on the first substrate 100, a second substrate 200 facing the first substrate 100 and spaced apart from the first substrate, and a liquid crystal layer 300 disposed between the first substrate 100 and the second substrate 200. The first substrate 100 may be a lower substrate, and the second substrate 200 may be an upper substrate.

Each of the first substrate 100 and the second substrate 200 includes a display area DA and a non-display area NA. The display area DA is an area on which an image is displayed, and the non-display area NA is an area on which an image is not displayed. The display area DA is surrounded by the non-display area NA.

The display area DA includes gate lines GL extending in a first direction X1, for example, in a row direction, data lines DL extending in a second direction X2, for example, in a column direction, and pixels PX formed in the regions defined by the intersection of the gate lines GL the data lines DL. The pixels PX are arranged in the first direction X1 and the second direction X2 to be substantially disposed in a matrix form.

Each of the pixels PX may display one color of primary colors in order to realize color display. Examples of the primary colors may include a red color, a green color, and a blue color.

The non-display area NA may be a light-blocking area. The non-display area NA of the first substrate 100 may be provided with a drive unit (not shown) for providing gate drive signals and data drive signals to the pixels PX of the display area DA. The gate lines GL and the data lines DL extend from the display area DA to the non-display area NA, and are electrically connected to the drive unit.

The liquid crystal layer 300 may be disposed between the first substrate 100 and the second substrate 200. The liquid crystal layer 300 may include liquid crystal molecules LC having positive dielectric anisotropy. The liquid crystal layer 300 may alternatively include liquid crystal molecules LC having negative dielectric anisotropy.

Hereinafter, components of the liquid crystal display device according to an exemplary embodiment of the present invention will be described in detail.

Figure 2:
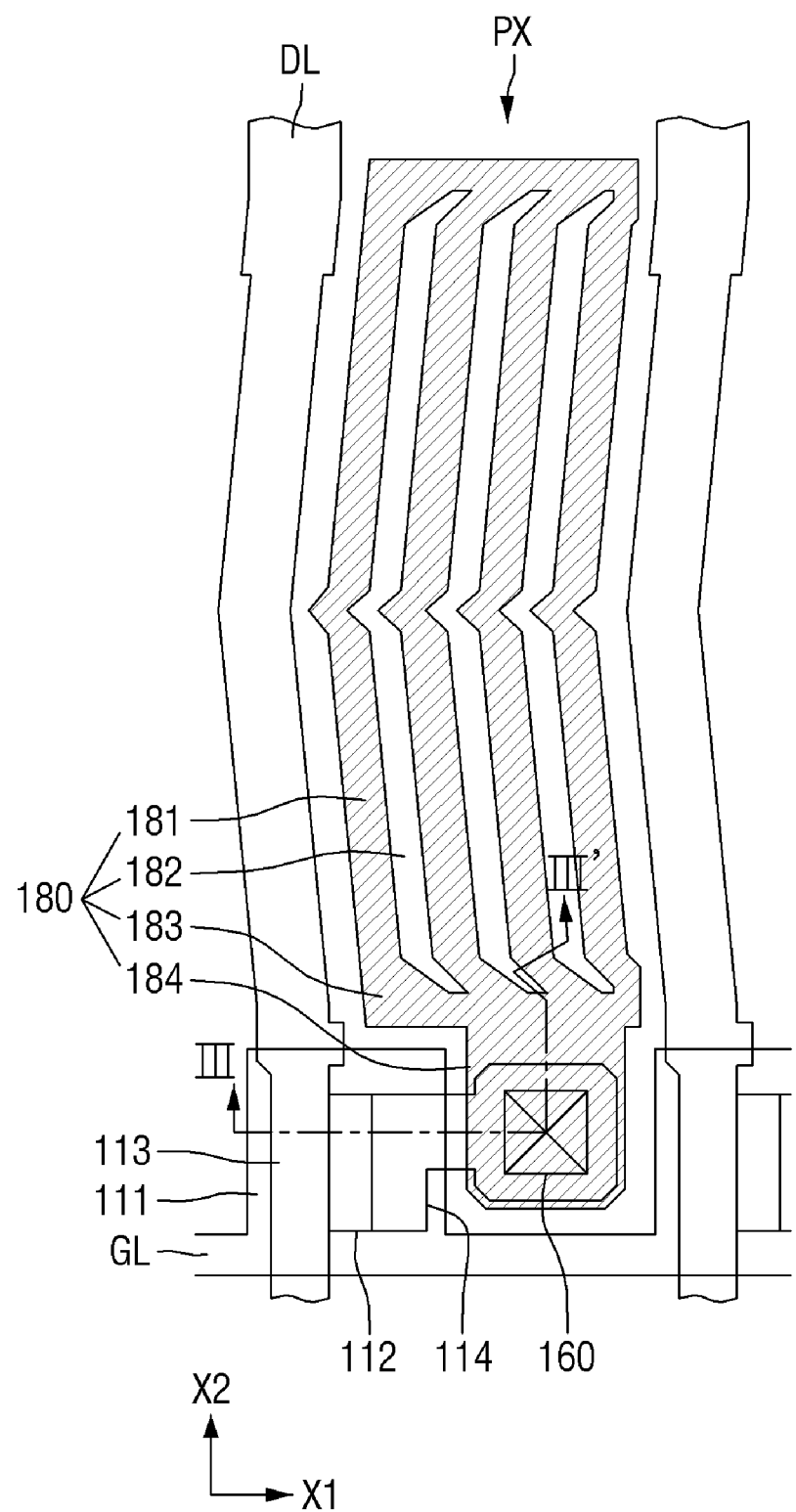
FIG. 2 is a schematic plan view of a pixel of the liquid crystal display device of FIG. 1.
Figure 3:
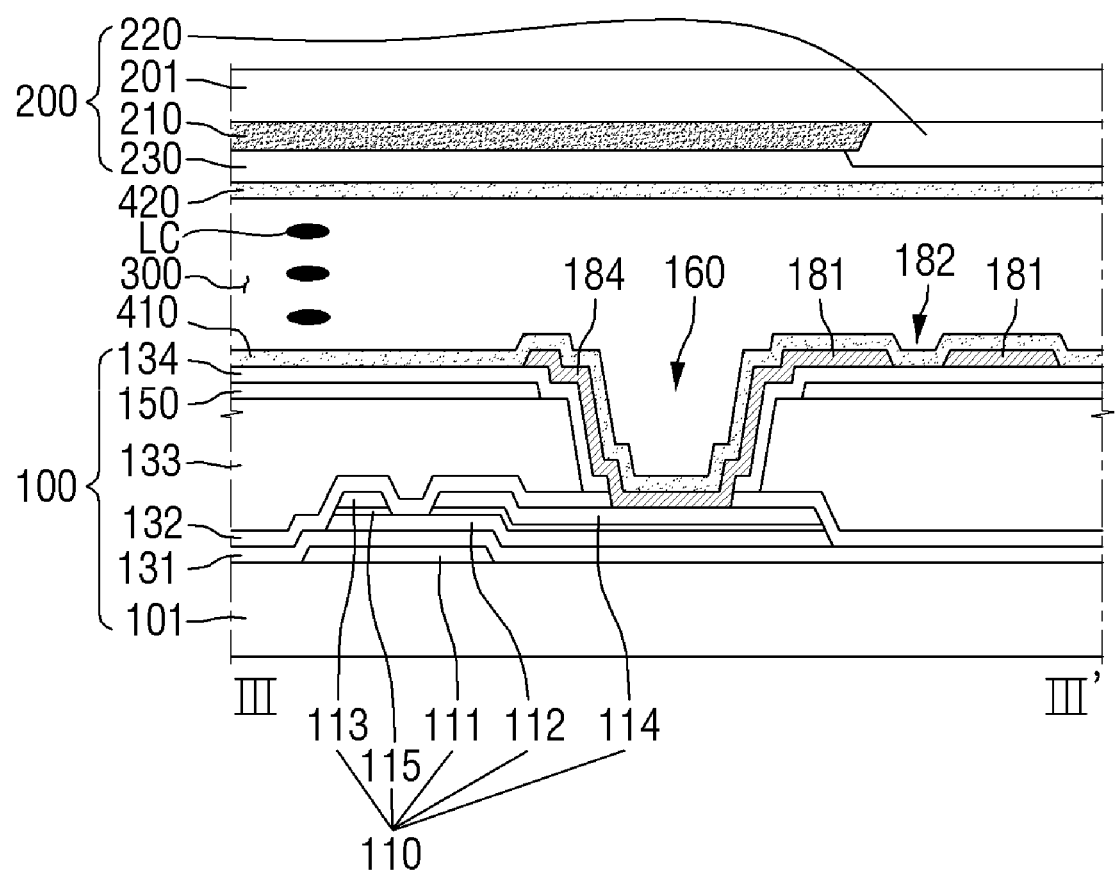
FIG. 3 is a schematic cross-sectional view taken along line of the pixel of FIG. 2.

FIG. 2 is a schematic plan view of a pixel of the liquid crystal display device of FIG. 1. FIG. 3 is a schematic cross-sectional view taken along line of the pixel of FIG. 2.

Referring to FIGS. 2 and 3, the first substrate 100 includes a first base substrate 101, at least one thin-film transistor 110, a common electrode 150, a pixel electrode 180, and protective layers/insulating layers.

The first base substrate 101 is a transparent insulating substrate, and may include a material having excellent permeability, heat resistance, and chemical resistance. For example, the first base plate 101 may be a silicon substrate, a glass substrate, or a plastic substrate.

A gate wiring layer is disposed on the first base substrate 101. The gate wiring layer includes a gate line GL and a gate electrode 111.

The gate line GL extends along the first direction X1. The gate electrode 111 may protrude upward from the gate line GL to be integrated with the gate line GL without a physical boundary. A gate signal provided from the gate line GL may be applied to the gate electrode 111. The gate wiring layer may be formed by forming a first metal layer that may include at least one of tantalum (Ta), tungsten (W), titanium (Ti), molybdenum (Mo), aluminum (Al), copper (Cu), silver (Ag), chromium (Cr) and neodymium (Nd), an alloy thereof, or a compound thereof, and then patterning the first metal layer. As the patterning, a mask process may be used, and other methods capable of forming a pattern may also be used.

A first insulating layer 131 is disposed on the gate wiring layer over the entire surface of the first base substrate 101. The first insulating layer 131 includes an insulating material, and may electrically insulate a layer disposed thereon and a layer disposed therebeneath from each other. The first insulating layer 131 may have a multi-layer structure including at least two insulating layers having different physical properties.

A semiconductor layer 112 is disposed on the first insulating layer 131. At least a part of the semiconductor layer 112 is disposed in the region overlapping the gate electrode 111. The semiconductor layer 112 may function as a channel of the thin-film transistor 110, and may turn-on or turn-off the channel according to the voltage provided to the gate electrode 111. The semiconductor layer 112 may be formed by patterning a semiconductor material layer including a semi-conductive material, such as amorphous silicon, polycrystalline silicon, or an oxide semiconductor.

A data wiring layer is disposed on the semiconductor layer 112. The data wiring layer includes a data line DL, a source electrode 113, and a drain electrode 114.

The data line DL extends along the second direction X2 to cross the gate line GL. A data signal may be applied to the data line DL. A pixel region PX is defined by the intersection of the data line DL and the gate line GL.

The source electrode 113 and the drain electrode 114 are disposed over the gate electrode 111 and the semiconductor layer 112 to be spaced apart from each other. The source electrode 113 may be formed to be integrated with the data line DL without a physical boundary. FIG. 2 shows the source electrode 113 as a part of the data line DL, but the source electrode 113 may be alternatively formed to protrude from the data line DL in the direction of the gate electrode 111. The drain electrode 114 is electrically connected to the pixel electrode 180 through a contact hole 160, which will be described in more detail below.

The data wiring layer may be formed by forming a second metal layer including a refractory metal, such as silver (Ag), gold (Au), copper (Cu), nickel (Ni), platinum (Pt), palladium (Pd), tungsten (W), aluminum (Al), tantalum (Ta), molybdenum (Mo), zinc (Zn), iron (Fe), titanium (Ti) or zirconium (Zr), an alloy thereof, or a metal nitride thereof, and then patterning the second metal layer.

An ohmic contact layer 115 may be disposed between the semiconductor layer 112 and the data wiring layer. The ohmic contact layer 115 may include an n+ hydrogenated amorphous silicon material doped with an n-type impurity at high concentration, or may include silicide.

A protective layer 132 may be disposed on the data wiring layer over the entire surface of the first base substrate 101. The protective layer 132 may be formed of an inorganic film, and may have a single-layer structure or a multi-layer structure. The protective layer 132 prevents the wirings and electrodes formed thereunder from being exposed and directly contacting an organic material. A planarization layer 133 is disposed on the protective layer 132 over the entire surface of the first base substrate 101. The planarization layer 133 may include an organic material. The planarization layer 133 may planarize a top surface of the first base substrate 101.

A common electrode 150 is disposed on the planarization layer 133. The common electrode 150 may be a transparent electrode. The transparent electrode may include, for example, indium tin oxide (ITO) and indium zinc oxide (IZO). The common electrode 150, to which a common voltage is applied, forms an electric field together with the pixel electrode 180, to which a data voltage is applied, so as to control the alignment direction of liquid crystal molecules LC in the liquid crystal layer 300. A second insulating layer 134 is disposed on the common electrode 150 to insulate the common electrode 150 and the pixel electrode 180 disposed on the second insulating layer 134.

A contact hole 160 is formed in the protective layer 132, the planarization layer 133, and the second insulating layer 134 to expose a part of the drain electrode 114. The drain electrode 114 may be electrically connected to the pixel electrode 180 through the contact hole 160.

The pixel electrode 180 is disposed on the second insulating layer 134 and the drain electrode 114 exposed by the contact hole 160 in the pixel region PX. The pixel electrode 180, similarly to the common electrode 150, may be a transparent electrode.

The pixel electrode 180 may be a pattern including branch electrodes 181, slit portions 182 formed between adjacent branch electrodes 181, a connecting electrode 183 connecting at least one end of the branch electrodes 181 with each other, and a protrusion electrode 184 protruding from the connecting electrode 183 in the direction of the contact hole 160.

Each of the branch electrodes 181 and the slit portions 182 has a bar shape that may be symmetrically bent with respect to the substantially central portion of the pixel region PX, and at least two domains may be formed in one pixel region. Accordingly, the arrangement of major axes of liquid crystal molecules LC for each domain may become different, thereby suppressing a color shift phenomenon in a specific azimuth. The protrusion electrode 184 is electrically connected to the drain electrode 114 through the contact hole 160 and receives a data voltage. The connecting electrode 183 may connect the protrusion electrode 184 to the branch electrodes 181 and uniformly provide the data voltage transferred from the protrusion electrode 184 to the branch electrodes 181.

A first alignment film 410 may be disposed on the first substrate 100. The first alignment film 410 may be a horizontal alignment film. In this case, the first alignment film 410 has anisotropy, and may arrange the major axes of liquid crystal molecules in the liquid crystal layer 300 to face a specific direction on a plane. Further, the first alignment film 410 may be a photo-alignment film including a material having a photo-functional group that may induce a photo-reaction. More detailed description of the first alignment film 410 will be described later together with a second alignment film 420.

The second substrate 200 may include a second base substrate 201, a light-blocking member 210, a color filter 220, and an overcoat layer 230.

The second base substrate 201, similarly to the first base substrate 101, may be a transparent insulating substrate. The light-blocking member 210 is disposed on the second base substrate 201. The light-blocking member 210, for example, may be a black matrix. The light-blocking member 210 may be disposed in boundary regions between the pixel regions, that is, in the regions overlapping the data lines DL and the gate lines GL and the region overlapping the thin-film transistor 110. More particularly, the light blocking member 210 is disposed at the boundary between the pixel regions, on which light emitted from a backlight unit (not shown) disposed under the first substrate 100 is substantially transmitted, so as to prevent unintentional color mixing and light leakage.

The color filter 220 may be disposed on the light-blocking member 210 in the region overlapping the pixel region PX. The color filter 220 may transmit the light of a specific wavelength band. The color filter 220 may be disposed between two data lines DL adjacent to each other, and may occupy a majority area of the pixel regions PX on plan view. Color filters having different colors that may each transmit the light of different wavelength ranges may be disposed in adjacent pixel regions PX, or the color filters may be omitted. FIGS. 2 and 3 illustrate a color filter on array structure, in which a color filter 220 is disposed over a thin-film transistor. However, the color filter 220 may be alternatively disposed under the thin-film transistor, or may be disposed in the first substrate 100.

The overcoat layer 230 is disposed on the light-blocking member 210 and the color filter 220 over the entire surface of the second base substrate 201. The overcoat layer 230 may be an organic film layer including an organic material. The overcoat layer 230 may prevent the light-blocking member 210 and the color filter 220 from being detached from the second base substrate 201 and misaligned with each other, and may planarize a lower surface of the second substrate 200. Further, the overcoat layer 230 may suppress the liquid crystal layer 300 from being contaminated by a compound, such as a solvent inflowing from the color filter 220, and may prevent defects, such as afterimages, occurring when driving a screen.

A second alignment film 420 may be disposed on the second substrate 200. The second alignment film 420, similarly to the first alignment film 410, may be a horizontal alignment film. Hereinafter, the first alignment film 410 and the second alignment film 420 will be described in detail.

Each of the first alignment film 410 and the second alignment film 420 may be a photo-alignment film. Each of the first alignment film 410 and the second alignment film 420 may include a material having identical repetitive units. Alternatively each of the first alignment film 410 disposed on the first substrate 100 and the second alignment film 420 disposed on the second substrate 200 may be a photo-alignment film having different photoreactive groups from each other, any one of the first alignment film 410 and the second alignment film 420 may not be a photo-alignment film, or any one of the first alignment film 410 and the second alignment film 420 may be omitted.

The first alignment film 410 and the second alignment film 420 may have substantially similar compositions and characteristics, and thus, the alignment film according to exemplary embodiments of the present invention will be described with reference to the first alignment film 410 in order to avoid obscuring various exemplary embodiments described herein.

The first alignment film 410 may be formed by applying an alignment film composition onto the first substrate 100. The alignment film composition will be described later together with the alignment film composition used in a method of manufacturing a liquid crystal display device according to an exemplary embodiment of the present invention.

The first alignment film 410 includes a copolymer of a dianhydride-based compound and a diamine-based compound. The copolymer may include a polyamic acid including a photoreactive group in a repetitive unit, a polymer obtained by partially imidizing the polyamic acid, a polyimide obtained by cyclodehydrating the polyamic acid, or a combination thereof. The photoreactive group may include a phenyl ester group, and may be derived from a diamine-based compound.

Specifically, the first alignment film 410 may include a polymer chain having a structure represented by Chemical Formula Ia or Chemical Formula Ib below in a repetitive unit.

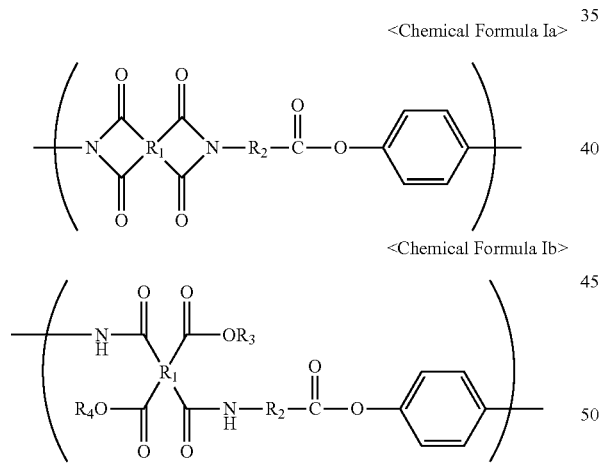

<Chemical Formula Ia>

<Chemical Formula Ib>

In Chemical Formula Ia and Chemical Formula Ib above, $R_1$ is a tetravalent organic group derived from an alicyclic dianhydride or an aromatic dianhydride, and $R_2$ is a divalent organic group derived from an alicyclic diamine or an aromatic diamine. In Chemical Formula Ib above, R3 and R4 are each independently hydrogen, a substituted or unsubstituted alkyl group, or a substituted or unsubstituted aryl group.

For example, the tetravalent organic group derived from an alicyclic dianhydride may be a substituted or unsubstituted alicyclic organic group of 4 to 16 carbon atoms, the tetravalent organic group derived from an aromatic dianhydride may be a substituted or unsubstituted aromatic organic group of 6 to 14 carbon atoms, the divalent organic group derived from an alicyclic diamine is a substituted or unsubstituted alicyclic organic group of 4 to 16 carbon atoms, and the divalent organic group derived from an aromatic diamine is a substituted or unsubstituted aromatic organic group of 6 to 14 carbon atoms.

As another example, the tetravalent organic group derived from an alicyclic dianhydride or the tetravalent organic group derived from an aromatic dianhydride may be any one of

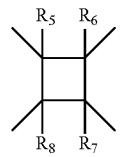

(here, R5 to R8 are each independently hydrogen, halogen, or an alkyl group),

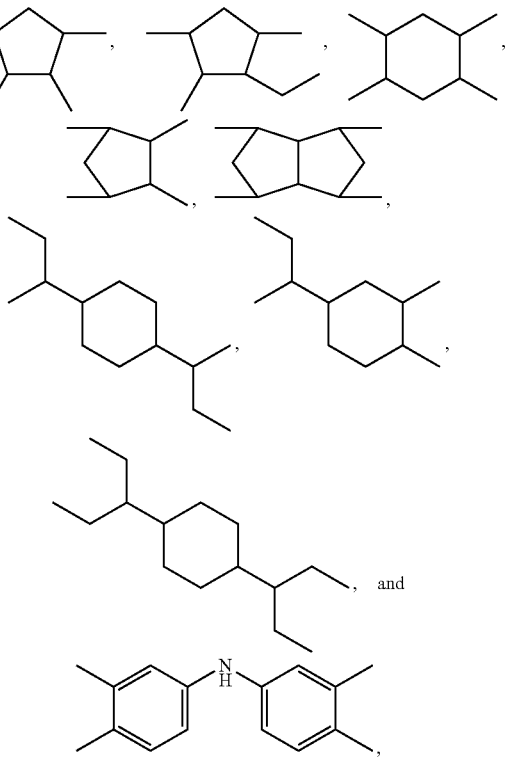

and the divalent organic group derived from an alicyclic diamine or the divalent organic group derived from an aromatic diamine may be any one of

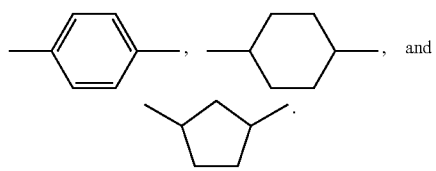

According to an exemplary embodiment of the present invention, the first alignment film 410 may include a polyimide chain having a structure represented by Chemical Formula Ic below in a repetitive unit.

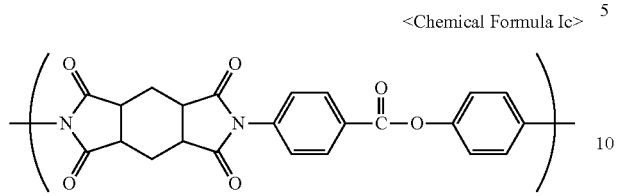
<Chemical Formula Ic>

The photoreactive group is irradiated with light, thereby inducing a photoreaction in the photoreactive group in the polymer chain.

Meanwhile, the first alignment film 410 may include a polymer chain having a structure represented by Chemical Formula Id or Chemical Formula Ie below in a repetitive unit.

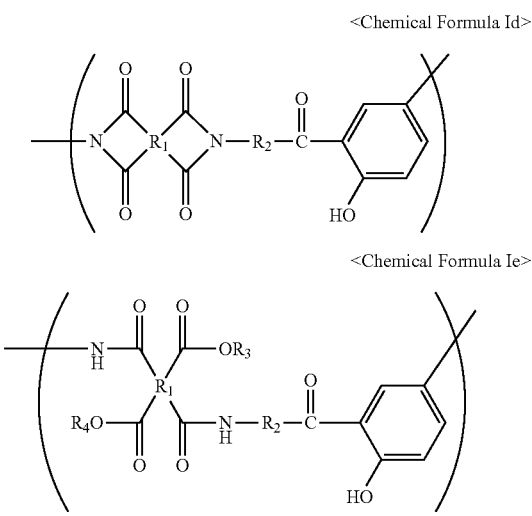
<Chemical Formula Id>
<Chemical Formula Ie>

In Chemical Formula Id and Chemical Formula Ie above, $R_1$ is a tetravalent organic group derived from an alicyclic dianhydride or an aromatic dianhydride, and $R_2$ is a divalent organic group derived from an alicyclic diamine or an aromatic diamine. In Chemical Formula Ie above, R3 and R4 are each independently hydrogen, a substituted or unsubstituted alkyl group, or a substituted or unsubstituted aryl group.

The structures represented by Chemical Formula Id and Chemical Formula Ie above may be formed by inducing a photoreaction in the photoreactive groups of Chemical Formula Ia and Chemical Formula Ib above, respectively. As the photoreaction, for example, Fries photoreaction represented by Reaction Formula I below may occur.

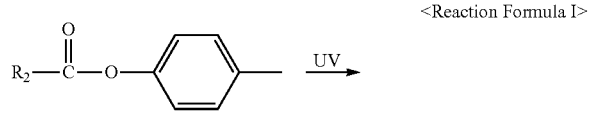
<Reaction Formula I>

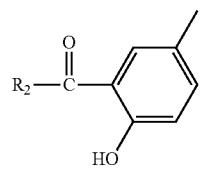

According to an exemplary embodiment of the present invention, the first alignment film 410 may include a polyimide chain having a structure represented by Chemical Formula If below in a repetitive unit.

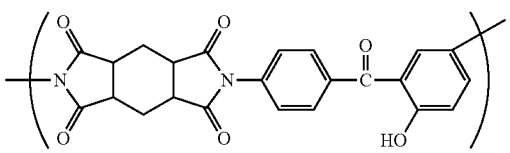
<Chemical Formula If>

The first alignment film 410 may include a cross-linker, or may include a cross-linking combination, in which the cross-linker is cross-linked with each of the polymer chains having structures represented by Chemical Formulae Ia to If above.

The cross-linker, for example, may be a flexible cross-linker having a flexible group. The cross-linker forms a cross-linking combination between the polymer chains to improve film hardness, and at least a part of the cross-linker may exist in the first alignment film 410 without forming the cross-linking combination.

Specifically, the first alignment film 410 may include a cross-linker represented by Chemical Formula IIa or Chemical Formula IIb below, or may include a cross-linking combination, in which a cross-linker represented by Chemical Formula IIa or Chemical Formula IIb below is cross-linked with the polymer chain.

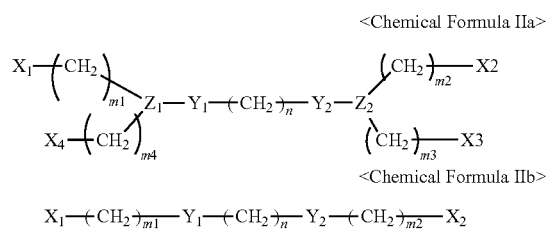
<Chemical Formula IIa>
<Chemical Formula IIb>

In Chemical Formula IIa and Chemical Formula IIb above, $X_1$ to $X_4$ are each independently any one of a hydroxyl group (—OH), an amino group (—$NH_2$), an epoxy group, an aziridine group, a carbodiimide group, an acrylate group, a methacrylate group, and a vinyl group. $Y_1$ and $Y_2$ are each independently any one of a single bond, —CO—, —COO—, —OCO—, —S—, —O—, —OOC— —$CH_2CH_2O$—, —$OCH_2CH_2$—, an aromatic compound of 6 to 30 carbon atoms, and an alicyclic compound of 4 to 20 carbon atoms. m1 to m4 are each independently an integer of 0 to 6, and n is an integer of 2 to 18. In Chemical Formula IIa above, $Z_1$ and $Z_2$ are each independently any one of

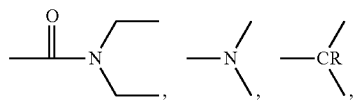

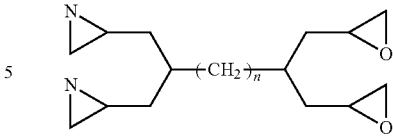

(here, R is H or an alkyl group of 1 to 3 carbon atoms), an aromatic compound of 6 to 30 carbon atoms, and an alicylic compound of 4 to 20 carbon atoms.

In Chemical Formula IIa and Chemical Formula IIb above, a flexible group including an alkyl chain having enough length to have flexibility exists between end groups, and the flexible group may impart flexibility to the cross-linker.

According to an exemplary embodiment of the present invention, when all of the four end groups ($X_1$, $X_2$, $X_3$, and $X_4$) of the cross-linker represented by Chemical Formula IIa above are identical functional groups or all of the two end groups ($X_1$ and $X_2$) of the cross-linker represented by Chemical Formula IIb above are identical functional groups, cross-linking proceeds under the same process conditions, and the reaction rate of the cross-linking may be maximized. In this case, the cross-linker, for example, may be represented by Chemical Formula IIc or Chemical Formula IId below.

<Chemical Formula IIc>

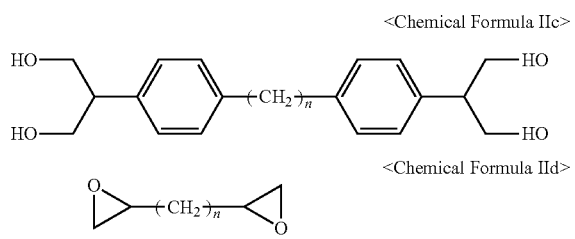

<Chemical Formula IId>

In Chemical Formula IIc and Chemical Formula IId above, n is an integer of 2 to 18.

According to an exemplary embodiment of the present invention, when two end groups $X_1$ and $X_4$ of the four end groups $X_1$, $X_2$, $X_3$, and $X_4$ of the cross-linker represented by Chemical Formula IIa above are identical functional groups, and when the other two end groups $X_2$ and $X_3$ thereof are identical functional groups and are different from the two end groups $X_1$ and $X_4$, during heat treatment processes, cross-linking first proceeds at the two end groups $X_1$ and $X_4$, and then proceeds at the other two end groups $X_2$ and $X_3$. When cross-linking proceeds at all end groups in cross-linker molecules during one heat treatment process, cross-linker particles may not be uniformly distributed, and thus may be aggregated on the surface of an alignment film, such that these cross-linker particles may be discovered together with foreign matter. However, when the end groups in the cross-linker molecules are sequentially/partially cross-linked, the aggregation of cross-linker particles may be suppressed. For example, the two end groups $X_1$ and $X_4$ may be an aziridine group, and the other two end groups $X_2$ and $X_3$ may be any one of an epoxy group, a hydroxyl group (—OH), an amino group (—NH$_2$), and a carbodiimide group. In this case, the cross-linker, for example, may be represented by Chemical Formula IIe below.

<Chemical Formula IIe>

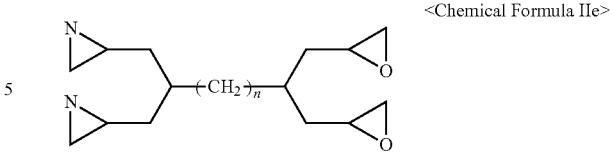

In Chemical Formula IIe above, n is an integer of 2 to 18.

When the lengths m1 and m4 of spacer groups for connecting each of the two end groups $X_1$ and $X_4$ with the flexible group, that is, $-(CH_2-)_{m1}$ and $-(CH_2-)_{m4}$, are equal to each other, and the lengths m2 and m3 of spacer groups for connecting each of the other two end groups $X_2$ and $X_3$ with the flexible group, that is, $-(CH_2-)_{m2}$ and $-(CH_2-)_{m3}$, are equal to each other, the cross-linker may have an asymmetric structure with respect to only one side and the other side thereof, and each of the one side and the other side of the cross-linker may be stably cross-linked with the polymer chain.

According to an exemplary embodiment of the present invention, two end groups of the cross-linker represented by Chemical Formula IIb above may be different from each other. For example, one end group $X_1$ may be an aziridine group, and the other end group $X_2$ may be any one of an epoxy group, a hydroxyl group, an amino group, and a carbodiimide group. In this case, the cross-linker, for example, may be represented by Chemical Formula IIf below.

<Chemical Formula IIf>

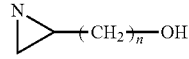

In Chemical Formula IIf above, n is an integer of 2 to 18.

The reactive group in a cross-linker molecule is cross-linked with a carboxyl group or amide group of polyamide or polyamic acid to form a cross-linking combination. Further, reactive groups in one cross-linker molecule may be cross-linked with one polymer chain, or may be cross-linked with adjacent polymer chains.

The cross-linker cross-links the polymer chains included in the first alignment film 410 to improve the film hardness of the first alignment film 410. As such, the anchoring energy of the surface of the first alignment film 410 is sufficiently secured to increase the alignment force of the first alignment film 410. In addition, the cross-linker improves the durability of the first alignment film 410, and the display quality and reliability of a liquid crystal display device including the first alignment film 410.

Further, the cross-linker includes a flexible group including an alkyl chain having enough length to exhibit flexibility between end groups, which are reactive groups. Due to the flexible group, the cross-linker may improve elasticity with respect to external stress and improve fluidity enabling the vibration and bending in a compound molecule or a cross-linked body. In addition, the flexible group may suppress the occurrence of afterimage of a liquid crystal display device by selecting the molecular length and displacement suitable for liquid crystal alignment even after the cross-linking with the polymer chains.

In particular, as will be described later, in an alignment film composition according to an exemplary embodiment of the present invention and an alignment film manufactured using the alignment film composition, during the process of heat treatment after irradiation with linearly polarized light, polymer chains are rearranged, so as to impart greater directionality. In the case where polymer chains are rearranged after the cross-linking of the cross-linker with the polymer chains, when a cross-linker having rigidity is used, afterimages may be increased although the film hardness of the alignment film may be improved. However, when a cross-linker having flexibility is used, the above problems with the rigid cross-linker may be reduced due to the elasticity and fluidity of the flexible cross-linker itself.

Hereinafter, a method of manufacturing a liquid crystal display device according to an exemplary embodiment of the present invention will be described.

Figure 4:
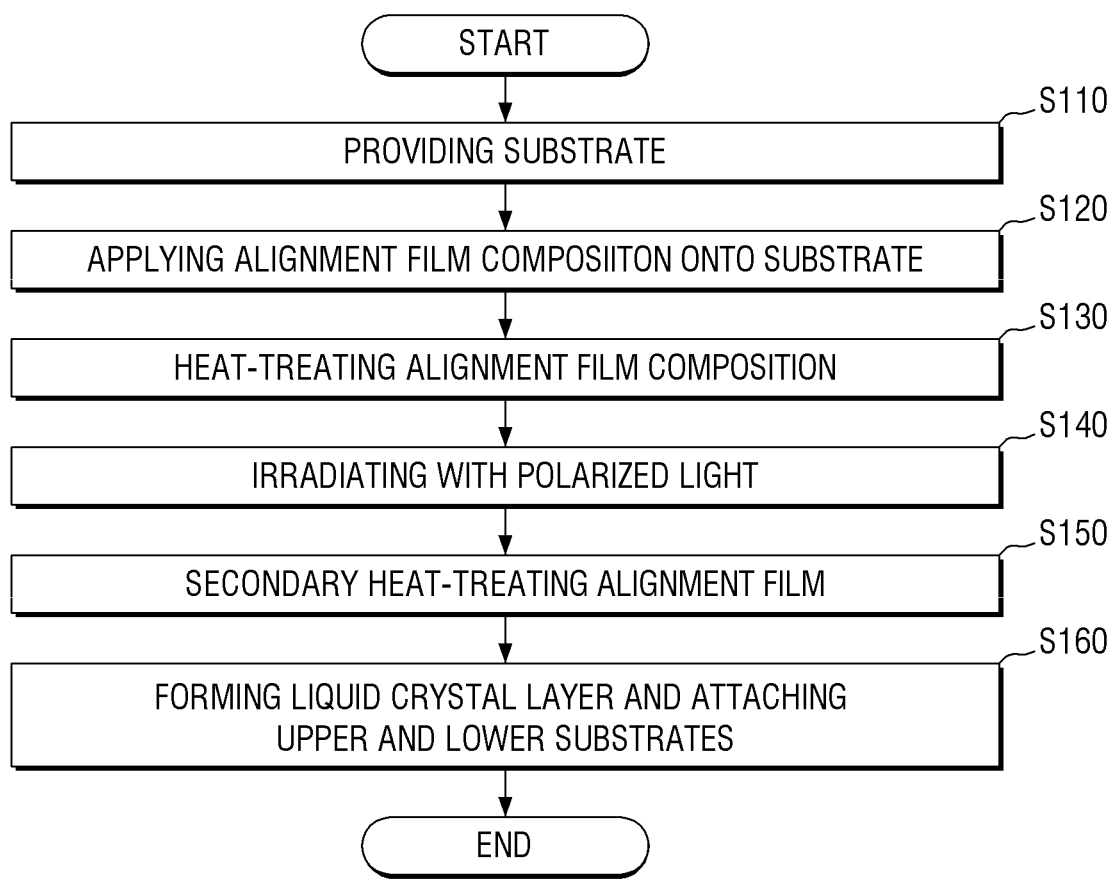
FIG. 4 is a flowchart showing a method of manufacturing a liquid crystal display device according to an exemplary embodiment of the present invention.

FIG. 4 is a flowchart showing a method of manufacturing a liquid crystal display device according to an exemplary embodiment of the present invention. FIGS. 5 to 9 are perspective views showing the method of manufacturing a liquid crystal display device of FIG. 4 according to a process order.

Referring to FIG. 4, first, a substrate 500 is provided at step S110. The substrate 500 may be the first substrate or the second substrate illustrated with reference to FIG. 3. The substrate 500 may be a thin-film transistor substrate including a first base substrate, a gate wiring layer, a semiconductor layer, a data wiring layer, a common electrode, a pixel electrode, and protective layers/insulating layers, or may be a counter substrate including a second base substrate, a light-blocking member, a color filter, and an overcoat layer. Since the arrangements, shapes, and schematic manufacturing methods of the first substrate, the second substrate, and the components thereof have previously been described with reference to FIGS. 1 to 3, detailed descriptions thereof will be omitted.

Figure 5:
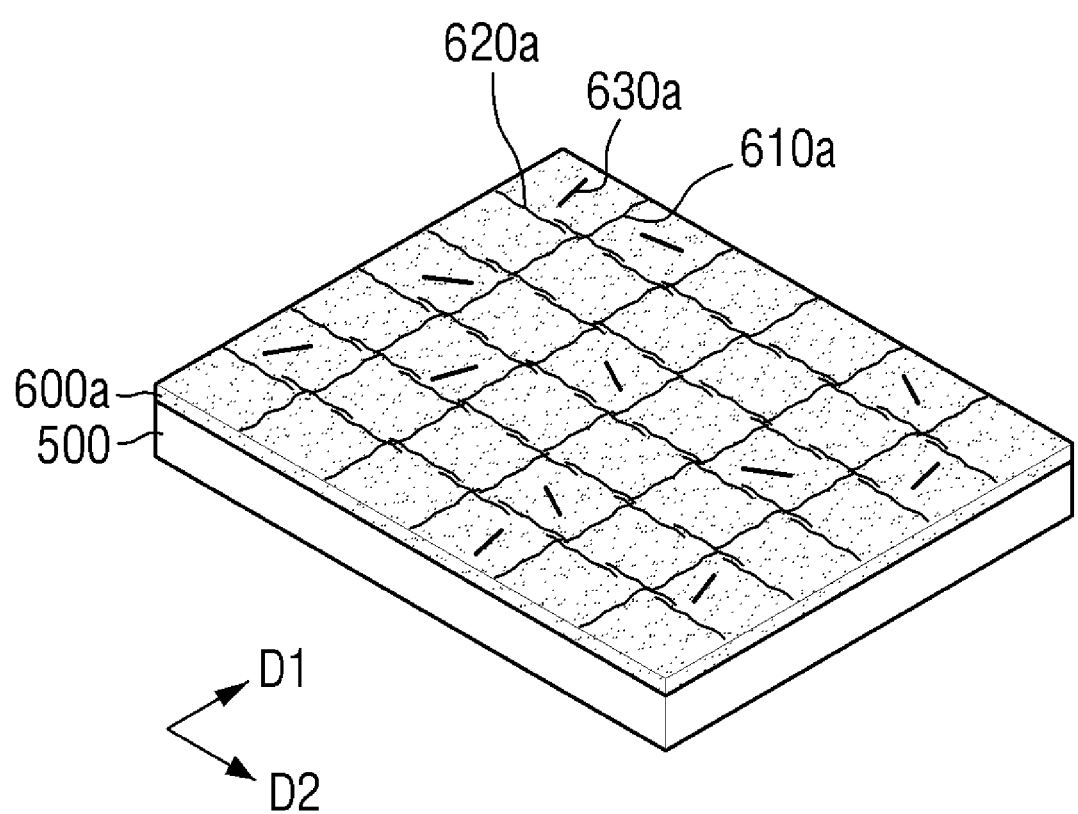
FIG. 5, FIG. 6, FIG. 7, FIG. 8, and FIG. 9 are perspective views showing the method of manufacturing a liquid crystal display device of FIG. 4 according to a process order.

Subsequently, referring to FIGS. 4 and 5, an alignment film composition 600a is applied onto the substrate 500 at step S120. As the method of applying the alignment film composition 600a onto the substrate 500, for example, spin coating or slit coating may be utilized.

The alignment film composition 600a includes copolymers 610a and 620b, each of which is a copolymer of a dianhydride-based compound and a diamine-based compound, and includes a polyamic acid including a photoreactive group in a repetitive unit, a polymer obtained by partially imidizing the polyamic acid, a polyimide obtained by cyclodehydrating the polyamic acid, or a combination thereof. The alignment film composition 600 further includes a cross-linker 630a and a predetermined solvent. The cross-linker 630a may be in an amount of about 2 wt % to about 10 wt % with respect to the total weight of the alignment film composition 600a.

Specifically, the alignment film composition 600a may include polymer chains 610a and 620a each having a structure represented by Chemical Formula Ia or Chemical Formula Ib below in a repetitive unit.

<Chemical Formula Ia>

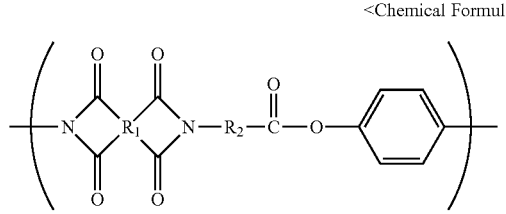

<Chemical Formula Ib>

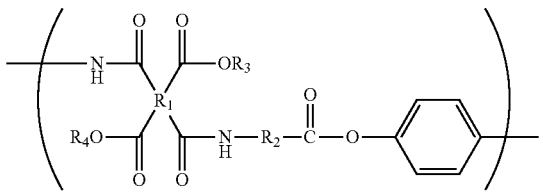

In Chemical Formula Ia and Chemical Formula Ib above, $R_1$ is a tetravalent organic group derived from an alicyclic dianhydride or an aromatic dianhydride, and $R_2$ is a divalent organic group derived from an alicyclic diamine or an aromatic diamine. In Chemical Formula Ib above, R3 and R4 are each independently hydrogen, a substituted or unsubstituted alkyl group, or a substituted or unsubstituted aryl group.

For example, the tetravalent organic group derived from an alicyclic dianhydride may be a substituted or unsubstituted alicyclic organic group of 4 to 16 carbon atoms, the tetravalent organic group derived from an aromatic dianhydride may be a substituted or unsubstituted aromatic organic group of 6 to 14 carbon atoms, the divalent organic group derived from an alicyclic diamine is a substituted or unsubstituted alicyclic organic group of 4 to 16 carbon atoms, and the divalent organic group derived from an aromatic diamine is a substituted or unsubstituted aromatic organic group of 6 to 14 carbon atoms.

As another example, the tetravalent organic group derived from an alicyclic dianhydride or the tetravalent organic group derived from an aromatic dianhydride may be any one of

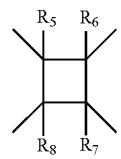

(here, R5 to R8 are each independently hydrogen, halogen, or an alkyl group),

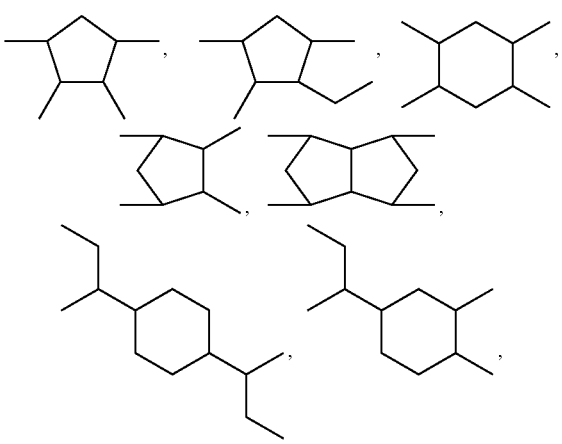

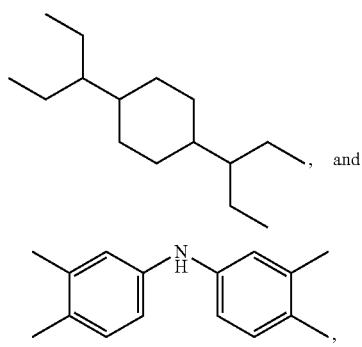

, and

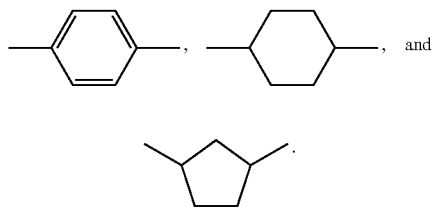

and the divalent organic group derived from an alicyclic diamine or the divalent organic group derived from an aromatic diamine may be any one of

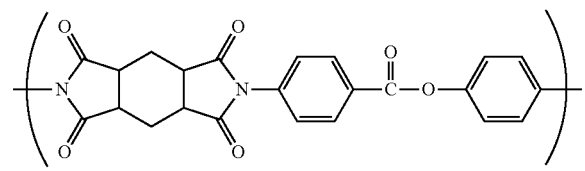

.

According to an exemplary embodiment of the present invention, the alignment film composition 600a may include a polyimide chain having a structure represented by Chemical Formula Ic below in a repetitive unit.

<Chemical Formula Ic>

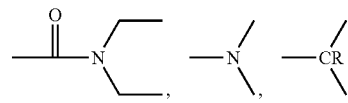

The polymer chains, each including a polyamic acid, a polymer obtained by partially imidizing the polyamic acid, a polyimide obtained by cyclodehydrating the polyamic acid, or a combination thereof, may exist with various directionalities. However, for convenience of explanation, a first polymer chain 610a is illustrated as extending in a first direction D1 of two vector directions and a second polymer chain 620a is illustrated as extending in a second direction D2 of two vector directions in FIGS. 5 to 9. Moreover, since the first polymer chains 610a having a predetermined length and the second polymer chains 620a having a predetermined length are repetitively arranged in the first direction D1 and second direction D2, respectively, they may be substantially treated as a continuum.

The alignment film composition 600a may include a cross-linker represented by Chemical Formula IIa or Chemical Formula IIb below.

<Chemical Formula IIa>

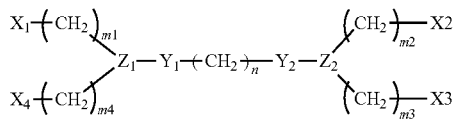

<Chemical Formula IIb>

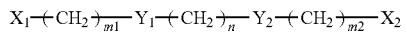

In Chemical Formula IIa and Chemical Formula IIb above, $X_1$ to $X_4$ are each independently any one of a hydroxyl group (—OH), an amino group (—NH$_2$), an epoxy group, an aziridine group, a carbodiimide group, an acrylate group, a methacrylate group, and a vinyl group, and $Y_1$ and $Y_2$ are each independently any one of a single bond, —CO—, —COO—, —OCO—, —S—, —O—, —OOC—, —CH$_2$CH$_2$O—, —OCH$_2$CH$_2$—, an aromatic compound of 6 to 30 carbon atoms, and an alicyclic compound of 4 to 20 carbon atoms. m1 to m4 are each independently an integer of 0 to 6, and n is an integer of 2 to 18. In Chemical Formula IIa above, $Z_1$ and $Z_2$ are each independently any one of

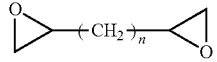

(here, R is H or an alkyl group of 1 to 3 carbon atoms), an aromatic compound of 6 to 30 carbon atoms, and an alicyclic compound of 4 to 20 carbon atoms.

According to an exemplary embodiment of the present invention, when all of the four end groups $X_1$, $X_2$, $X_3$, and $X_4$ of the cross-linker represented by Chemical Formula IIa above are identical functional groups or all of the two end groups $X_1$ and $X_2$ of the cross-linker represented by Chemical Formula IIb above are identical functional groups, cross-linking proceeds under the same process conditions, and the reaction rate of the cross-linking may be maximized. In this case, the cross-linker, for example, may be represented by Chemical Formula IIc or Chemical Formula IId below.

<Chemical Formula IIc>
<Chemical Formula IId>

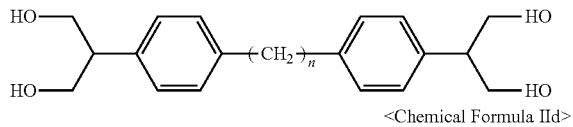

In Chemical Formula IIc and Chemical Formula IId above, n is an integer of 2 to 18.

According to an exemplary embodiment of the present invention, when two end groups $X_1$ and $X_4$ of the four end groups $X_1$, $X_2$, $X_3$, and $X_4$ of the cross-linker represented by Chemical Formula IIa above are identical functional groups, and when the other two end groups $X_2$ and $X_3$ thereof are identical functional groups and are different from the two end groups $X_1$ and $X_4$, during heat treatment processes, cross-linking first proceeds at the two end groups $X_1$ and $X_4$, and then proceeds at the other two end groups $X_2$ and $X_3$.

When cross-linking proceeds at all end groups in cross-linker molecules during one heat treatment process, cross-linker particles may not be uniformly distributed, and thus may be aggregated on the surface of an alignment film, such that these cross-linker particles may be discovered together with foreign matter. However, when the end groups in the cross-linker molecules are sequentially/partially cross-linked, the aggregation of cross-linker particles may be suppressed. For example, the two end groups $X_1$ and $X_4$ may be an aziridine group, and the other two end groups $X_2$ and $X_3$ may be any one of an epoxy group, a hydroxyl group (—OH), an amino group (—NH$_2$), and a carbodiimide group. In this case, the cross-linker, for example, may be represented by Chemical Formula IIe below.

<Chemical Formula IIe>

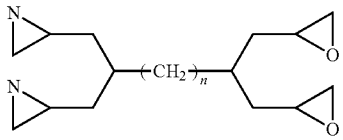

In Chemical Formula IIe above, n is an integer of 2 to 18.

When the lengths m1 and m4 of spacer groups for connecting each of the two end groups $X_1$ and $X_4$ with the flexible group, that is, $-(CH_2-)_{m1}$ and $-(CH_2-)_{m4}$, are equal to each other, and the lengths m2 and m3 of spacer groups for connecting each of the other two end groups $X_2$ and $X_3$ with the flexible group, that is, $-(CH_2-)_{m1}$ and $-(CH_2-)_{m3}$, are equal to each other, the cross-linker may have an asymmetric structure with respect to only one side and the other side thereof, and each of the one side and the other side of the cross-linker may be stably cross-linked with the polymer chain.

According to an exemplary embodiment of the present invention, two end groups of the cross-linker represented by Chemical Formula IIb above may be different from each other. For example, one end group $X_1$ may be an aziridine group, and the other end group $X_2$ may be any one of an epoxy group, a hydroxyl group, an amino group, and a carbodiimide group. In this case, the cross-linker, for example, may be represented by Chemical Formula IIf below.

<Chemical Formula IIf>

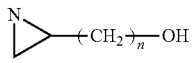

In Chemical Formula IIf above, n is an integer of 2 to 18.

Since other specific configurations of the copolymers and the cross-linker are the same as those of the copolymers and the cross-linker included in the first and/or second alignment film of the liquid crystal display device illustrated above, detailed descriptions thereof will be omitted.

Figure 6:
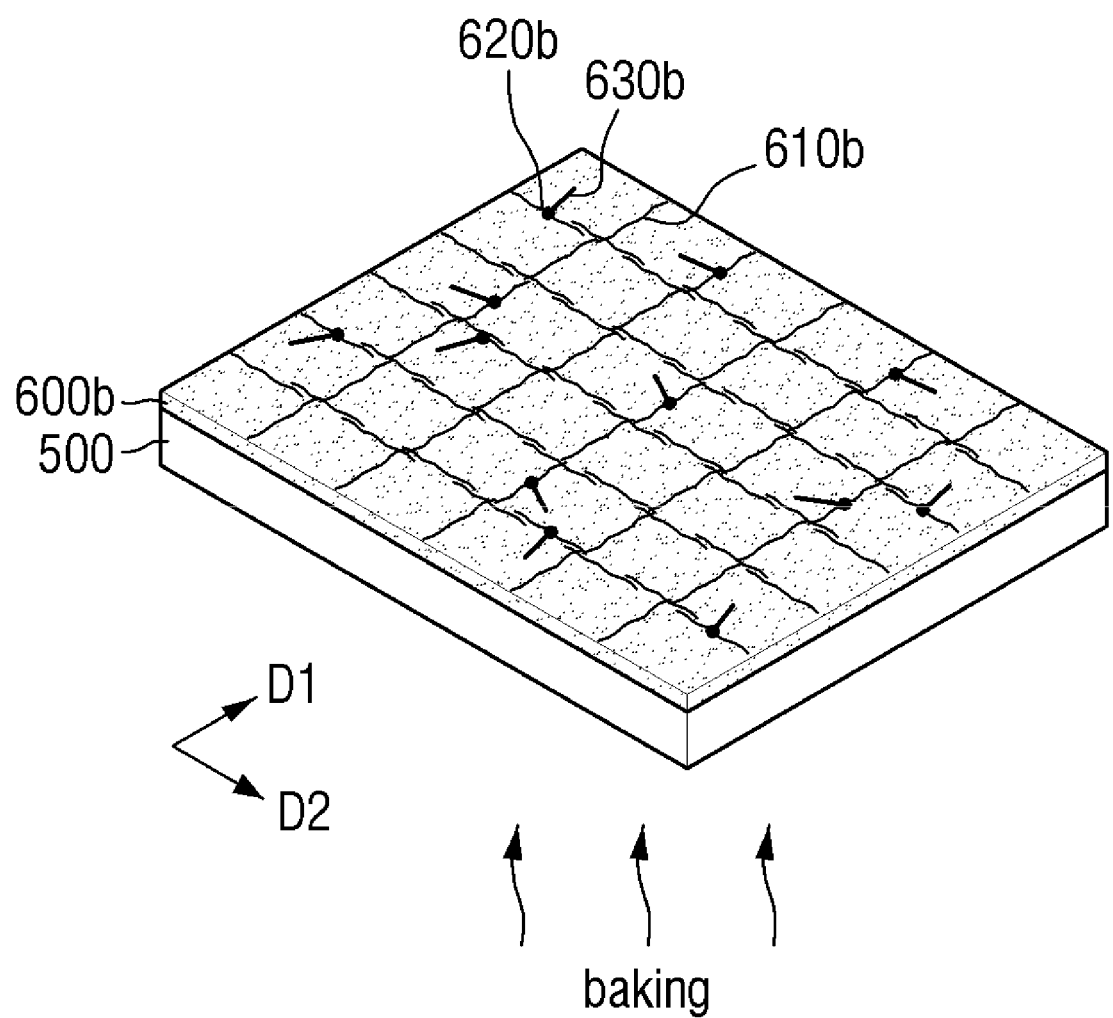

Subsequently, referring to FIGS. 4 and 6, the alignment film composition is heat-treated at step S130. According to an exemplary embodiment of the present invention, in the step (S130) of heat-treating the alignment film composition, the alignment film composition may be pre-baked. The pre-baking temperature may be 50° C. to 80° C., and preferably 60° C. to 70° C. The pre-baking time may be 60 seconds to 300 seconds, and preferably 65 seconds to 120 seconds.

In the step (S130) of heat-treating the alignment film composition, an alignment film 600b may be formed by removing a solvent from the alignment film composition 600a. Through this step, the fluidity of the alignment film 600b may be reduced, and the dispersibility of a compound including the first and second polymer chains 610b and 620b, and cross-linker 630b dispersed in the alignment film 600b may be reduced. The alignment film 600b may be the first alignment film on the first substrate or second alignment film on the second substrate.

The step (S130) of heat-treating the alignment film composition may induce the crosslinking between at least one end of the cross-linker 630b included in the alignment film 600b and the first polymer chain 610b and/or the second polymer chain 620b. For example, the cross-linker including a reactive group including an aziridine group at least one end thereof may be induced to be cross-linked with the first polymer chain and/or second polymer chain during the step (S130) of heat treating the alignment film composition, but the cross-linking therebetween may not occur according to the reactive group located at the end of the cross-linker.

Prior to the light irradiation step (S140) to be described later, the alignment film composition according to the present exemplary embodiment is heat-treated at 100° C. or lower, to form an alignment film having sufficient anisotropy. In this manner, foreign matters generated from several heat treatment processes or from a high-temperature heat treatment process at above 100° C., unintended additional reactions, or damages to an alignment film from continuous exposure to high temperatures may be reduced, so as to improve the reliability of the alignment film and reduce the manufacturing costs thereof by simplifying associated processes. As used herein, the "one-time heat treatment" refers to a single process performed in the same chamber without sudden changes in process conditions (for example, heat treatment temperature, and the like), or refers to a single process performed under the substantially same conditions even if it is performed in multiple chambers.

According to an exemplary embodiment of the present invention, the step (S130) of heat-treating the alignment film composition 600a may be carried out several times. In this case, the heat treatment following the pre-baking may be performed at a higher temperature than the pre-baking, that is, at higher than 100° C., for a longer time than the pre-baking.

Figure 7:
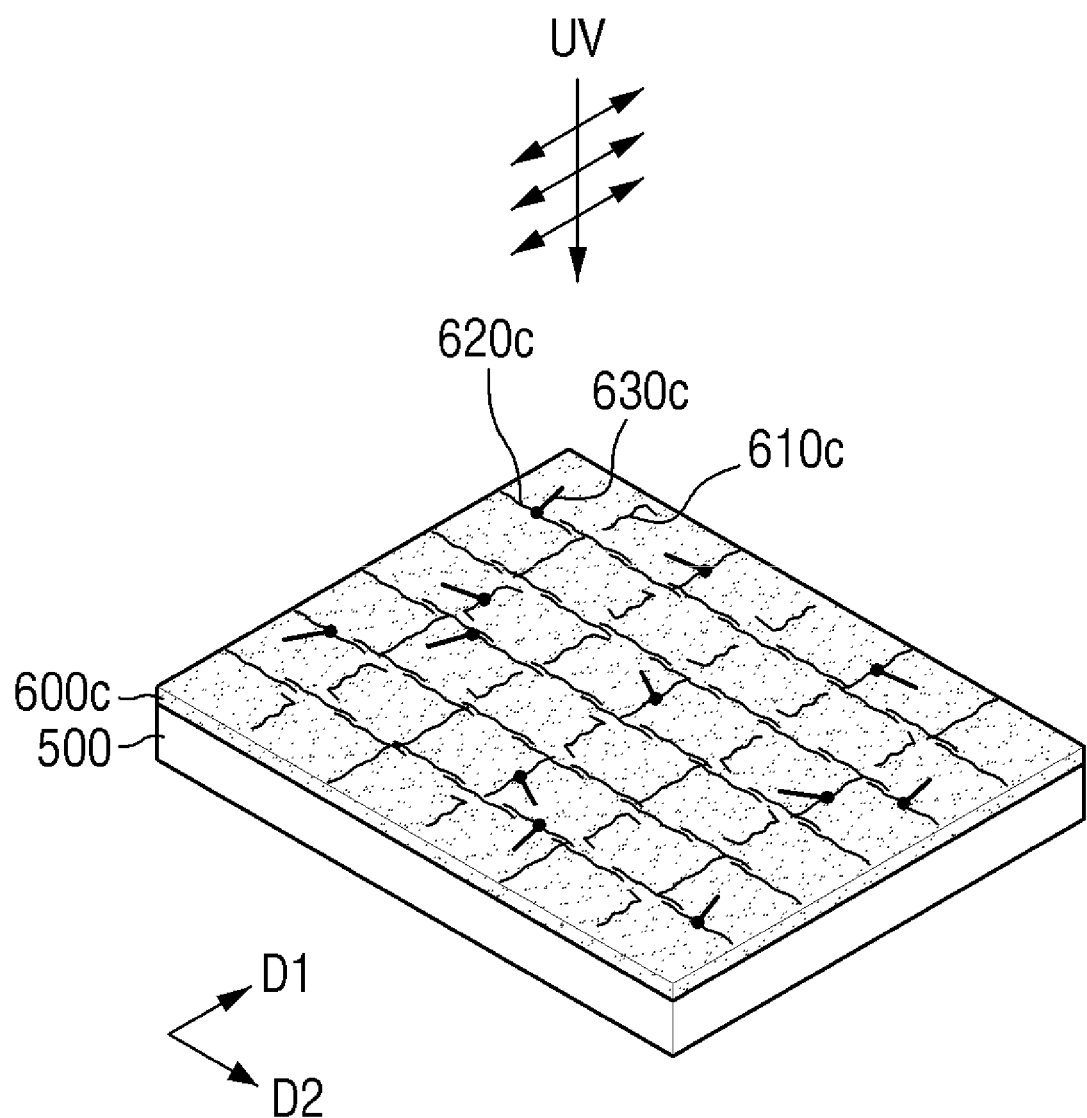

Subsequently, referring to FIGS. 4 and 7, the alignment film is irradiated with light polarized in the first direction D1 at step S140. In the step (S140) of irradiating the alignment film with linearly polarized light, anisotropy may be imparted to the alignment film. The light may be at least one of ultraviolet light, infrared light, far infrared light, electron beam, and radiation. For example, the light may be ultraviolet light having a wavelength of about 250 nm to 330 nm, ultraviolet light having a wavelength of about 254 nm, or ultraviolet light having a wavelength of about 313 nm.

When the alignment film 600c is irradiated with the light polarized in the first direction D1, a photoreaction is induced in the first polymer chain 610c having the same direction (absorption axis direction) as the polarized light, whereas the photoreaction may not substantially occur in the second polymer chain 620c. As the photoreaction, for example, Fries photoreaction represented by Reaction Formula I below may occur.

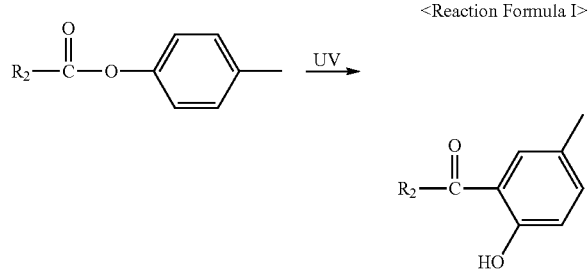

<Reaction Formula I>

Specifically, at least a part of the first polymer chain 610c having a linearity in the first direction D1 is rearranged and stabilized, since its main chain is bent in a direction different from the first direction D1 by the reaction of Reaction Formula I above. Accordingly, the continuity of the first polymer chain 610c in the first direction D1 is reduced. However, the second polymer chain 620c having a linearity in the second direction D2 may impart anisotropy to the entire alignment film 600c, since the photoreaction is not induced. In this case, the reaction rate of the photoreaction may be about 7% to 25%. When the reaction rate thereof is 7% or more, a photoreaction enough to impart anisotropy to the alignment film 600c may be induced, and when the reaction rate thereof is 25% or less, the decrease in anisotropy due to the excessive progress of a photoreaction may be prevented. The reaction rate thereof, for example, may be controlled through the exposure amount of irradiated light.

Further, in the step (S140) of irradiating the alignment film with linearly polarized light, the alignment film 600c may be irradiated with light in an exposure amount of about 0.01 J/cm$^2$ to 3.0 J/cm$^2$, preferably about 0.3 J/cm$^2$ to 1.5 J/cm$^2$, and more preferably about 0.7 J/cm$^2$ to 1.3 J/cm$^2$. The exposure amount may be controlled by the irradiation time of the alignment film 600c with light or the output of light. However, the exposure amount may be changed according to the drive mode of a liquid crystal display device or the physical properties of main materials constituting the alignment film 600c.

According to the present exemplary embodiment, since by-products are not generated through a photoreaction, such as photodecomposition, an additional cleaning process may not be required before the step (S150) of heat-treating the alignment film again, which will be later. Therefore, damage to an alignment film having anisotropy or adsorption of foreign matter that may occur during a cleaning process may be prevented, and thus, improving the processability. It is contemplated that, however, a predetermined cleaning process, such as dry cleaning or wet cleaning may be carried out.

Figure 8:
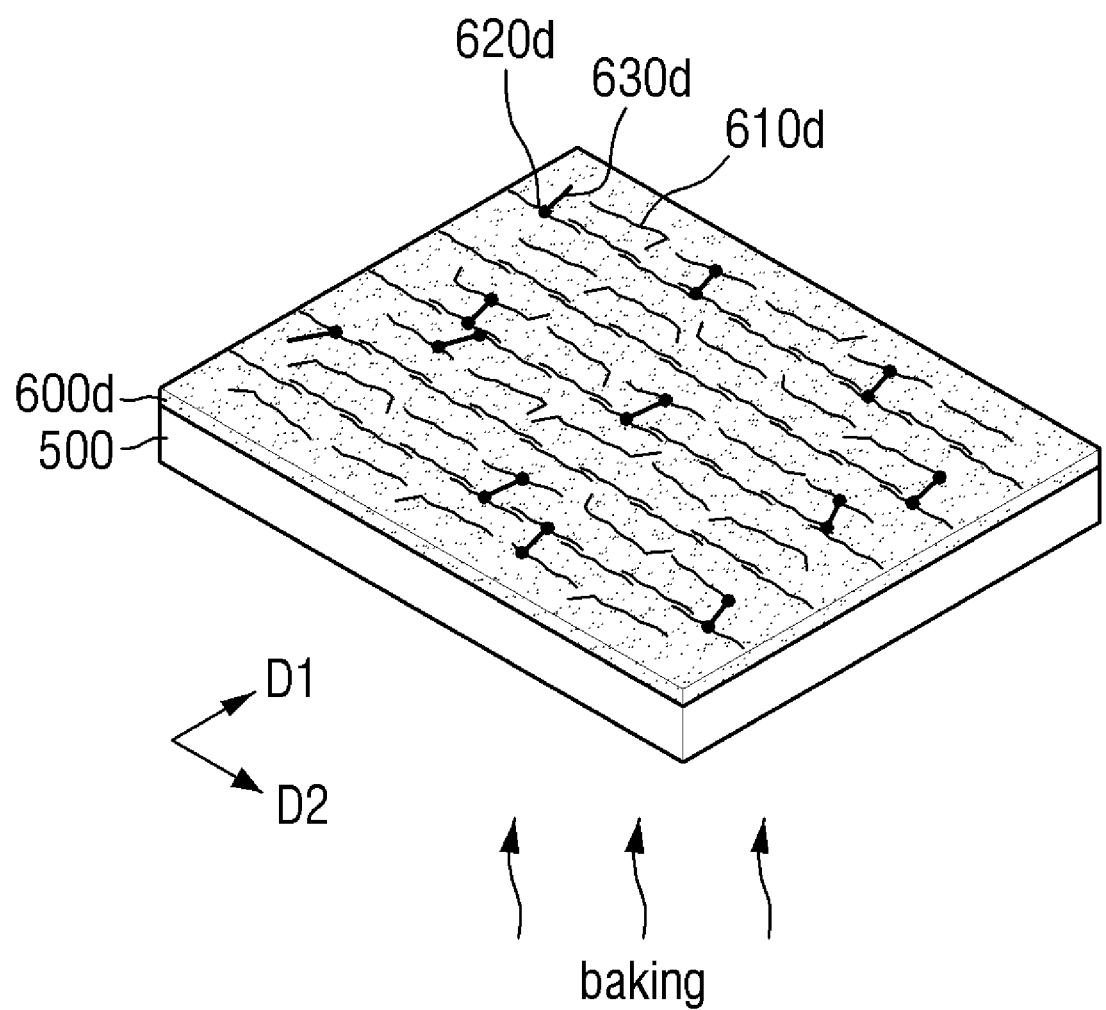

Subsequently, referring to FIGS. 4 and 8, the alignment film 600d is heat-treated again (i.e., secondary heat-treatment) at step S150. According to an exemplary embodiment of the present invention, in the step (S150) of secondary heat-treating the alignment film 600d, the alignment film 600d may be secondarily baked. The secondary baking step may be performed at higher temperature for longer time, compared to the pre-baking step. The secondary baking temperature may be about 150° C. to 270° C., and preferably about 205° C. to 235° C. Further, the secondary baking may be performed for about 700 seconds to 3000 seconds, and preferably about 900 seconds to 1800 seconds.

In the step (S150) of secondary heat-treating the alignment film 600d, unstable reactive groups from the light exposure are stabilized, and the first and/or second polymer chains 610d and/or 620d are rearranged, thereby further improving alignment force. Further, in the step (S150), the remaining solvent may be removed, thereby increasing the heat resistance of the alignment film 600d.

The reason for this may be that because the first polymer chains 610c are partially intermitted in the first direction D1 by the step (S140) of irradiating the alignment film with polarized light, and thus the first polymer chains 610c are easily rearranged by the interaction force between the adjacent first polymer chains 610c, whereas the second polymer chains 620c are not easily rearranged due to the strong interaction force therebetween.

More particularly, the first polymer chains 610d, having been partially photoreacted, are rearranged by heat treatment, whereas the second polymer chains 620d are maintained in the second direction D2 without being rearranged. Therefore, the entire direction of the first polymer chains 610d and the second polymer chains 620d in two vector directions may substantially converge to the second direction D2, thereby further imparting anisotropy to the alignment film 600d.

Meanwhile, in the step (S150) of secondary heat-treating the alignment film, the crosslinking is induced between at least one end of the cross-linker 630d included in the alignment film 600d and the first polymer chain 610d and/or the second polymer chain 620d. For example, in the cross-linker having a reactive group including any one of an epoxy group, a hydroxyl group (—OH), an amino group (—NH$_2$), and a carbodiimide group, the cross-linking between the reactive group and the first and/or second polymer chain 610d and/or 620d may be induced, but a part of the reactive group may not be cross-linked.

The cross-linker 630d causes the crosslinking between the first polymer chains 610d, between the second polymer chains 620d, or between the first polymer chain 610d and the second polymer chain 620d, so as to improve the film hardness of the alignment film 600d, thereby increasing alignment force and improving the durability of the alignment film 600d.

Further, the cross-linker 630d includes a flexible group including an alkyl chain having enough length to exhibit flexibility between end groups, which are reactive groups. Due to the flexible group, the cross-linker may suppress the occurrence of afterimages by selecting the molecular length and displacement suitable for liquid crystal alignment, even after the cross-linking with the polymer chains.

Particularly, in the step (S150) of secondary heat-treating the alignment film, when the cross-linking between the cross-linker 630d and the first and second polymer chains 610d and 620d is performed and then the rearrangement thereof occurs, if a cross-linker having rigidity is used, afterimages may become serious although improving the film hardness of the alignment film. However, if a cross-linker having flexibility is used, above problems with the cross-linker having rigidity may be reduced due to the elasticity and fluidity of the cross-linker itself.

Figure 9:
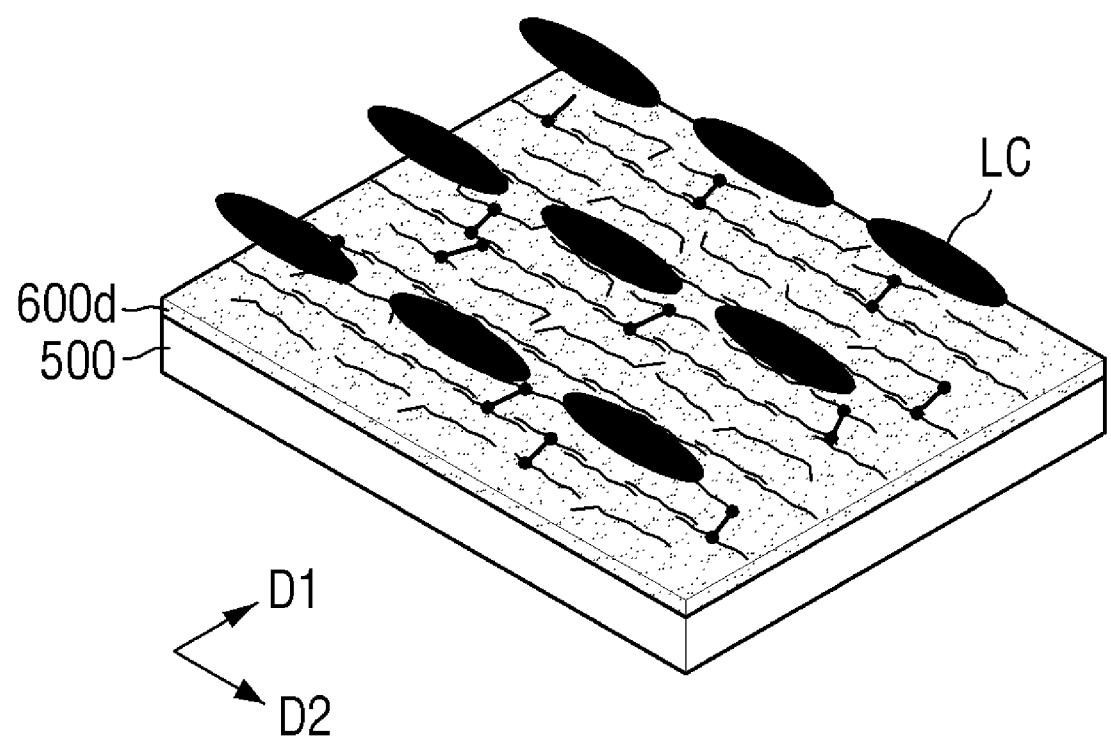

Subsequently, referring to FIGS. 4 and 9, a liquid crystal layer including liquid crystal molecules LC is formed on the substrate 500, and upper and lower substrates are attached to each other at step S160. The major axes of the liquid crystal molecules LC may be substantially aligned in the second direction D2 due to the anisotropy formed by the polymer chains 610d and 620d of the alignment film 600d. According to an exemplary embodiment of the present invention, in the step (S160) of forming the liquid crystal layer, a liquid crystal composition may be disposed onto the substrate 500 and/or a counter substrate (not shown), and then the substrate 500 and the counter substrate may be attached to each other. However, in the step (S160), the substrate 500 and the counter substrate (not shown) may be attached to each other, and then the liquid crystal composition may be injected thereinto.

Hereinafter, exemplary embodiments of the present invention will be described in more detail with reference to Preparation Examples and Comparative Examples.

Preparation Example

An alignment film composition including a copolymer obtained by mixing a phenylester diamine having a photo-reactive group with an aromatic dianhydride at a molar ratio of 1:1, and polymerizing the mixture using a conventional technology, 5 wt % of a cross-linker having a flexible group, and a solvent was applied onto a substrate. The substrate was then heat-treated at 70° C. for 70 seconds, so as to form an alignment film (hereinafter, primary heat treatment step). Subsequently, the alignment film was irradiated with linearly polarized ultraviolet light in an exposure amount of 0.5 J/cm$^2$ (light irradiation step), and then heat-treated again at 230° C. for 1800 seconds (hereinafter, secondary heat treatment step). Subsequently, a liquid crystal layer was formed on the alignment film, so as to manufacture a liquid crystal display device.

Comparative Example 1

An alignment film composition was prepared in the same manner as in the Preparation Example, except that 5 wt % of a rigid cross-linker having no flexible group was used instead of 5 wt % of the cross-linker having a flexible group. Subsequently, the primary heat treatment step, light irradiation step, and secondary heat treatment step were sequentially carried out, so as to manufacture a liquid crystal display device.

Comparative Example 2

An alignment film composition was prepared in the same manner as in the Preparation Example, except that a copolymer obtained by mixing an aromatic diamine with cyclobutane dianhydride at a molar ratio of 1:1 and polymerizing the mixture using a conventional technology was used, instead of the copolymer of a phenylester diamine and an aromatic dianhydride. Subsequently, the primary heat treatment step, light irradiation step, and secondary heat treatment step were sequentially carried out, so as to manufacture a liquid crystal display device.

Comparative Example 3

An alignment film composition was prepared in the same manner as in the Comparative Example 2, except that 5 wt % of a rigid cross-linker having no flexible group was used, instead of 5 wt % of the cross-linker having a flexible group. Subsequently, the primary heat treatment step, light irradiation step, and secondary heat treatment step were sequentially carried out, so as to manufacture a liquid crystal display device.

Experimental Results

The afterimage level, film hardness, and light leakage of each of the liquid crystal display devices manufactured according to Preparation Example and Comparative Examples 1 to 3 were evaluated, and the results thereof are summarized in Table 1 below. The evaluation of afterimage level was performed by measuring a delta angle (A angle) after applying a voltage of 4.5 V for 25 hours, and the evaluation of film hardness was performed by observing a scratch formed after rubbing a single-plate substrate on which an alignment film was printed to a thickness of 300 nm. As used herein, the delta angle means a difference between the azimuth of initial liquid crystals and the azimuth of liquid crystals after applying a voltage.

TABLE 1

|  | Delta angle (°) | Scratch | Light leakage |
| --- | --- | --- | --- |
| Preparation Example | 0.11 | X | X |
| Comparative Example 1 | 0.35 | X | X |
| Comparative Example 2 | 0.15 | X | ○ |
| Comparative Example 3 | 0.4 | X | ○ |

Referring to Table 1 above, it can be ascertained that the delta angle of the liquid crystal display device of Preparation Example using a cross-linker having a flexible group was decreased compared to that of the liquid crystal display device of Comparative Example 1 using a rigid cross-linker having a flexible group.

Further, it can be ascertained that the delta angle of the liquid crystal display device of Preparation Example using a copolymer of a phenylester diamine and an aromatic dianhydride was improved compared to that of each of the liquid crystal display devices of Comparative Example 2 and Comparative Example 3 using a copolymer of an aromatic diamine and cyclobutane dianhydride.

According to exemplary embodiments of the present invention, an alignment film composition provides a photo-alignment film, to which anisotropy is imparted by a photoreaction. Further, the film hardness of the photo-alignment film may be sufficiently improved by crosslinking the polymer materials forming the photo-alignment film, and afterimages may be minimized by crosslinking the materials having a flexible group. As such, film hardness may be improved to increase reliability, and may reduce afterimages, thereby providing a liquid crystal display device having improved display quality and a method of manufacturing the liquid crystal display device.

While exemplary embodiments have been shown and described above, it will be apparent to those skilled in the art that modifications and variations could be made without departing from the spirit and scope of the invention as defined the appended claims. The exemplary embodiments should be considered in a descriptive sense only and not for purposes of limitation.

What is claimed is:

1. An alignment film composition, comprising:
    a copolymer of a dianhydride-based compound and a diamine-based compound, the copolymer having a structure represented by Chemical Formula Ia or Chemical Formula Ib in a repetitive unit; and
    a cross-linker represented by Chemical Formula IIa or Chemical Formula IIb, wherein:

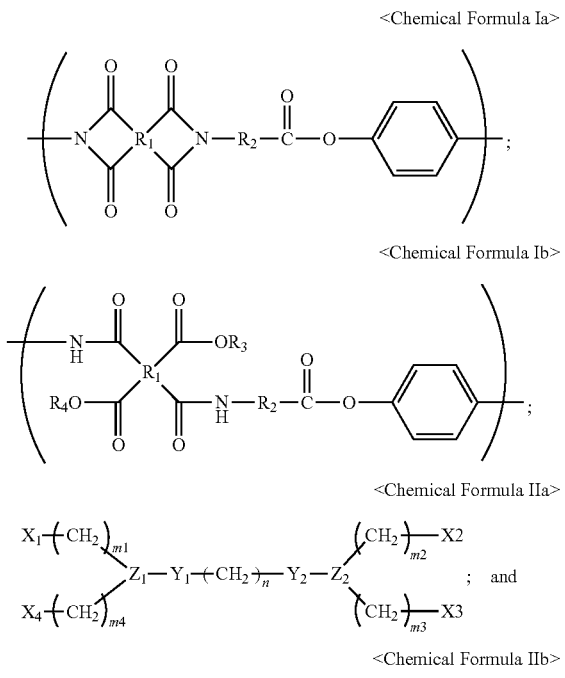

wherein:

in Chemical Formula Ia and Chemical Formula Ib, $R_1$ is

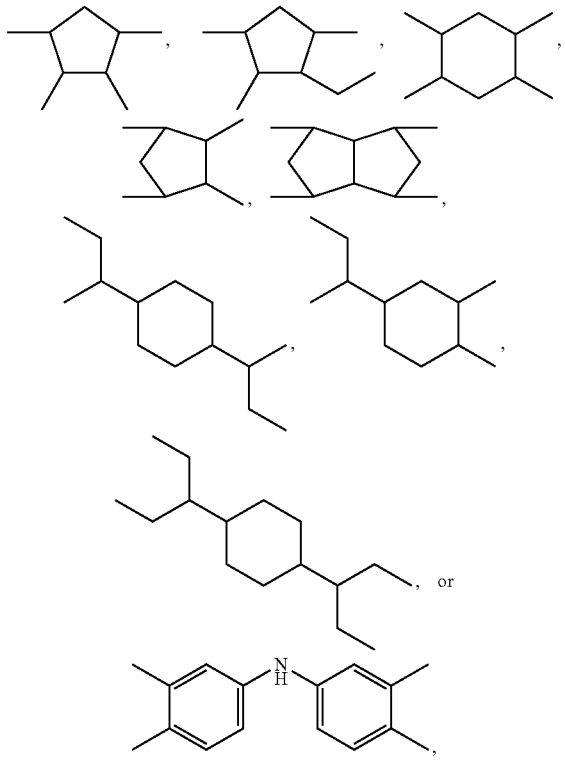

and $R_2$ is a divalent alicyclic group;

in Chemical Formula Ib, $R_3$ and $R_4$ are each independently hydrogen, a substituted or unsubstituted alkyl group, or a substituted or unsubstituted aryl group;

in Chemical Formula IIa and Chemical Formula IIb:

$X_1$ to $X_4$ are each independently any one of a hydroxyl group (—OH), an amino group (—$NH_2$), an epoxy group, an aziridine group, a carbodiimide group, an acrylate group, a methacrylate group, and a vinyl group;

$Y_1$ and $Y_2$ are each independently any one of a single bond, —CO—, —COO—, —OCO—, —S—, —O—, —OOC— —$CH_2CH_2O$—, —$OCH_2CH_2$—, an aromatic compound of 6 to 30 carbon atoms, and an alicyclic compound of 4 to 20 carbon atoms;

m1 to m4 are each independently an integer of 0 to 6; and n is an integer of 2 to 18; and in Chemical Formula IIa, $Z_1$ and $Z_2$ are each independently any one of

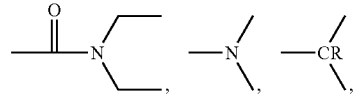

R being H or an alkyl group of 1 to 3 carbon atoms, an aromatic compound of 6 to 30 carbon atoms, and an alicylic compound of 4 to 20 carbon atoms.

2. The alignment film composition of claim 1, wherein in Chemical Formula Ia and Chemical Formula Ib, $R_2$ is

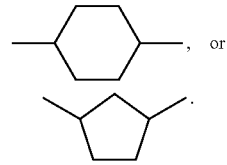

3. The alignment film composition of claim 1, wherein in Chemical Formula IIa:

$X_1$ and $X_4$ are identical functional groups; and $X_2$ and $X_3$ are identical functional groups.

4. The alignment film composition of claim 3, wherein in Chemical Formula IIa and Chemical Formula IIb, $X_1$ and $X_2$ are identical functional groups.

5. The alignment film composition of claim 3, wherein in Chemical Formula IIa and Chemical Formula IIb, X, and $X_2$ are different functional groups.

6. The alignment film composition of claim 5, wherein in Chemical Formula IIa and Chemical Formula IIb, X, is an aziridine group.

7. The alignment film composition of claim 1, wherein the cross-linker comprises 2 wt % to 10 wt % with respect to the total weight of the alignment film composition.

8. A method of manufacturing a liquid crystal display device, the method comprising:

providing a substrate;

applying an alignment film composition onto the substrate;

heat-treating the alignment film composition to form an alignment film;

irradiating the heat-treated alignment film with linearly polarized light; and heat-treating the light-irradiated alignment film,
wherein the alignment film composition comprises:
  a copolymer having a structure represented by Chemical Formula Ia or Chemical Formula Ib in a repetitive unit; and
  a cross-linker represented by Chemical Formula IIa or Chemical Formula IIb below,
wherein:

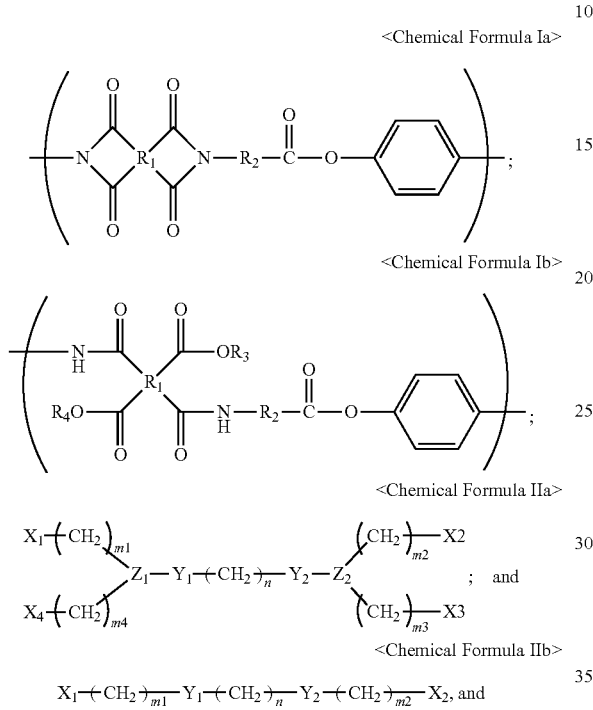

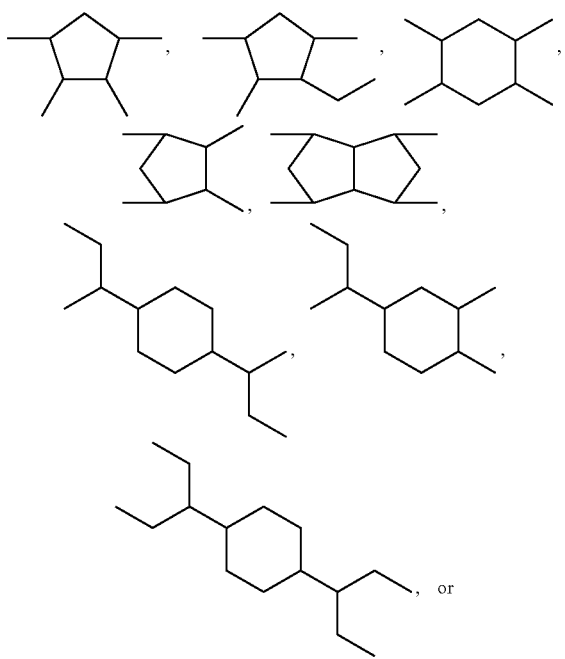

wherein:
  in Chemical Formula Ia, $R_1$ is

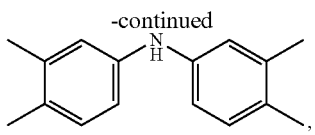

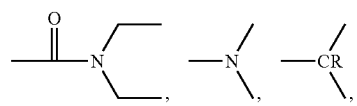

and $R_2$ is a divalent alicyclic group;
  in Chemical Formula Ib, $R_1$ is a tetravalent organic group derived from an alicyclic dianhydride or an aromatic dianhydride, and $R_2$ is a divalent alicyclic group; and
  in Chemical Formula Ib, $R_3$ and $R_4$ are each independently hydrogen, a substituted or unsubstituted alkyl group, or a substituted or unsubstituted aryl group;
in Chemical Formula IIa and Chemical Formula IIb:
  $X_1$ to $X_4$ are each independently any one of a hydroxyl group (—OH), an amino group (—NH$_2$), an epoxy group, an aziridine group, a carbodiimide group, an acrylate group, a methacrylate group, and a vinyl group;
  $Y_1$ and $Y_2$ are each independently any one of a single bond, —CO—, —COO—, —OCO—, —S—, —O—, —OOC— —CH$_2$CH$_2$O—, —OCH$_2$CH$_2$—, an aromatic compound of 6 to 30 carbon atoms, and an alicyclic compound of 4 to 20 carbon atoms;
  m1 to m4 are each independently an integer of 0 to 6; and
  n is an integer of 2 to 18; and
in Chemical Formula IIa:
  $Z_1$ and $Z_2$ are each independently any one of R being H or an alkyl group of 1 to 3 carbon atoms, an aromatic compound of 6 to 30 carbon atoms, and an alicyclic compound of 4 to 20 carbon atoms.

9. The method of claim 8, wherein heat-treating the alignment film composition is performed at a temperature of 100° C. or lower before the irradiating the alignment film with light.

10. The method of claim 8, wherein the copolymer is cross-linked with at least a part of the cross-linker during heat-treating the alignment film composition.

11. The method of claim 8, wherein the copolymer is cross-linked with at least a part of the cross-linker during heat-treating the light-irradiated alignment film composition.

12. The method of claim 8, wherein the heat-treated alignment film composition is irradiated with linearly polarized ultraviolet light having a wavelength of 250 nm to 330 nm, during irradiating the heat-treated alignment film with linearly polarized light.

13. The method of claim 8, wherein the heat-treated alignment film composition is irradiated with linearly polarized light having an exposure amount of 0.01 J/cm$^2$ to 3.0 J/cm$^2$, during irradiating the heat-treated alignment film with linearly polarized light.

14. A liquid crystal display device, comprising:
  a substrate; and
  an alignment film disposed on the substrate, wherein the alignment film comprises:
a copolymer having a structure represented by Chemical Formula Ia or Chemical Formula Ib in a repetitive unit; and
a cross-linking combination comprising the copolymer cross-linked with a cross-linker represented by Chemical Formula IIa or Chemical Formula IIb,
wherein:

<Chemical Formula Ia>

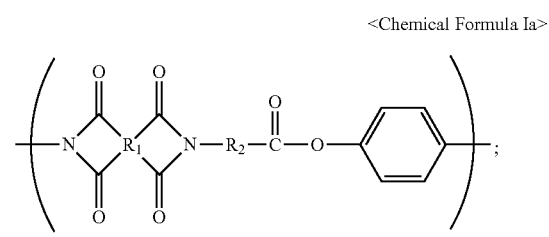

<Chemical Formula Ib>

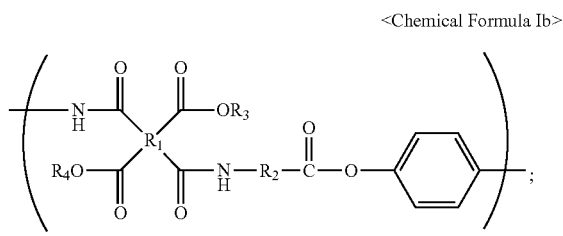

<Chemical Formula IIa>

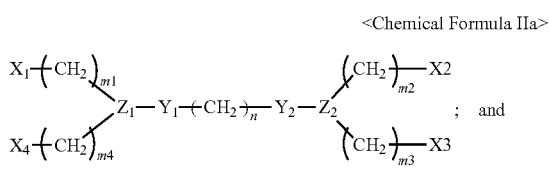
; and

<Chemical Formula IIb>

, and wherein:
in Chemical Formula Ia and Chemical Formula Ib, $R_1$ is

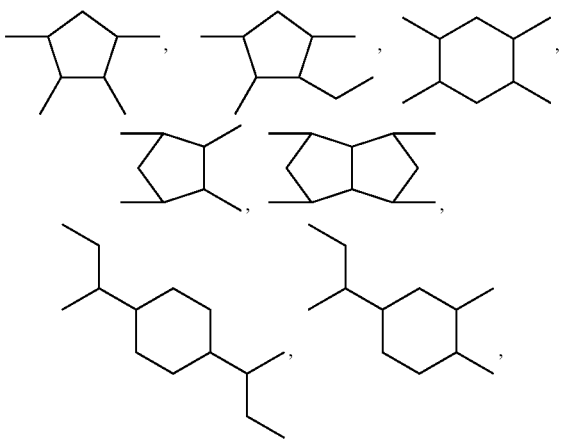

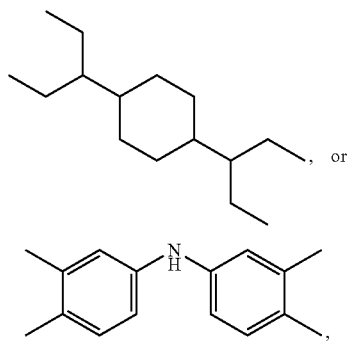

and $R_2$ is a divalent alicyclic group;
in Chemical Formula Ib, $R_3$ and $R_4$ are each independently hydrogen, a substituted or unsubstituted alkyl group, or a substituted or unsubstituted aryl group;
in Chemical Formula IIa and Chemical Formula IIb:
$X_1$ to $X_4$ are each independently any one of a hydroxyl group (—OH), an amino group (—NH$_2$), an epoxy group, an aziridine group, a carbodiimide group, an acrylate group, a methacrylate group, and a vinyl group;
$Y_1$ and $Y_2$ are each independently any one of a single bond, —CO—, —COO—, —OCO—, —S—, —O—, —OOC— —CH$_2$CH$_2$O—, —OCH$_2$CH$_2$—, an aromatic compound of 6 to 30 carbon atoms, and an alicyclic compound of 4 to 20 carbon atoms;
m1 to m4 are each independently an integer of 0 to 6; and
n is an integer of 2 to 18; and
in Chemical Formula IIa:
$Z_1$ and $Z_2$ are each independently any one of

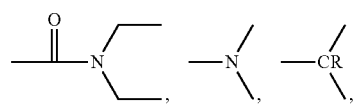

R being H or an alkyl group of 1 to 3 carbon atoms, an aromatic compound of 6 to 30 carbon atoms, and an alicylic compound of 4 to 20 carbon atoms.

15. The liquid crystal display device of claim 14, wherein in Chemical Formula Ia and Chemical Formula Ib, $R_2$ is

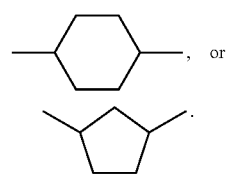

16. The liquid crystal display device of claim 14, wherein the alignment film further comprises a polymer chain having a structure represented by Chemical Formula Id or Chemical Formula Ie in a repetitive unit, wherein:

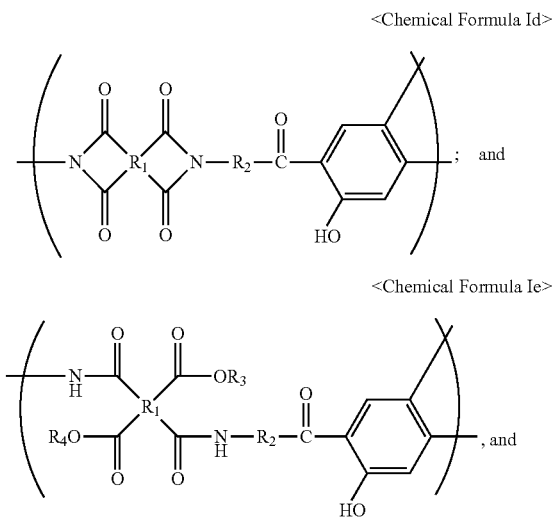

wherein:
in Chemical Formula Id and Chemical Formula Ie:
$R_1$ is a tetravalent organic group derived from an alicyclic dianhydride or an aromatic dianhydride; and
$R_2$ is a divalent organic group derived from an alicyclic diamine or an aromatic diamine; and
in Chemical Formula Ie:
$R_3$ and $R_4$ are each independently hydrogen, a substituted or unsubstituted alkyl group, or a substituted or unsubstituted aryl group.

17. The liquid crystal display device of claim 14, wherein in Chemical Formula IIa:
$X_1$ and $X_4$ are identical functional groups; and
$X_2$ and $X_3$ are identical functional groups.

18. The liquid crystal display device of claim 17, wherein in Chemical Formula IIa and Chemical Formula IIb, $X_1$ and $X_2$ are identical functional groups.

19. The liquid crystal display device of claim 17, wherein in Chemical Formula IIa and Chemical Formula IIb, $X_1$ and $X_2$ are different functional groups.

20. The liquid crystal display device of claim 19, wherein in Chemical Formula IIa and Chemical Formula IIb, $X_1$ is an aziridine group.

* * * * *